US012363802B2

(12) United States Patent
Corwin et al.

(10) Patent No.: US 12,363,802 B2
(45) Date of Patent: Jul. 15, 2025

(54) INDUCTIVE COOKTOP COIL AND DISPLAY SYSTEM

(71) Applicant: GHSP, Inc., Holland, MI (US)

(72) Inventors: Cort C. Corwin, Grand Haven, MI (US); Ben Devries, Holland, MI (US); Andrew Foley, Holland, MI (US); Warren Gutherie, West Olive, MI (US); John Videtich, Zeeland, MI (US)

(73) Assignee: GHSP, Inc., Holland, MI (US)

( * ) Notice: Subject to any disclaimer, the term of this patent is extended or adjusted under 35 U.S.C. 154(b) by 705 days.

(21) Appl. No.: 17/758,526

(22) PCT Filed: Dec. 4, 2020

(86) PCT No.: PCT/US2020/063425

§ 371 (c)(1),
(2) Date: Jul. 8, 2022

(87) PCT Pub. No.: WO2021/113721

PCT Pub. Date: Jun. 10, 2021

(65) Prior Publication Data

US 2023/0044815 A1 Feb. 9, 2023

Related U.S. Application Data

(60) Provisional application No. 62/944,160, filed on Dec. 5, 2019.

(51) Int. Cl.
*H05B 6/06* (2006.01)
*H05B 6/12* (2006.01)

(52) U.S. Cl.
CPC ........... *H05B 6/065* (2013.01); *H05B 6/1218* (2013.01); *H05B 6/1254* (2013.01);
(Continued)

(58) Field of Classification Search
CPC .... H05B 6/065; H05B 6/1218; H05B 6/1254; H05B 6/1263; H05B 6/1272; H05B 2213/03; H05B 2213/05; H05B 6/1209
See application file for complete search history.

(56) References Cited

U.S. PATENT DOCUMENTS 3,816,690 A 6/1974 Mittelmann
2012/0138590 A1* 6/2012 Brosnan ............... H05B 6/1218 219/220

(Continued)

FOREIGN PATENT DOCUMENTS

DE 102007003564 A1 * 3/2008 ........... H05B 6/1245
EP 2395813 A1 12/2011

(Continued)

OTHER PUBLICATIONS

European Search Report for Application No. 20895378.6; mailed Dec. 14, 2023; 11 pp.

(Continued)

*Primary Examiner* — Jesse S Bogue
(74) *Attorney, Agent, or Firm* — Bodman PLC

(57) ABSTRACT

An inductive cooktop includes a transparent panel that supports a cookware object. An electrically actuated panel, such as a display panel, is disposed below the transparent panel. The electrically actuated panel includes two sets of lines, such as data and scan lines, disposed orthogonal to each other to form a two-dimensional matrix that is configured to operate associated elements with an addressing scheme. An array of induction coils are disposed below the electrically actuated panel that are each operable to generate an electromagnetic field that inductively couples with the cookware object supported at the transparent panel. The induction coils are operable to generate an electromagnetic field with a flux direction in general parallel alignment with
(Continued)

one set of lines, such as the data lines, to prevent the electromagnetic field from inducing a voltage on the lines.

20 Claims, 17 Drawing Sheets

(52) U.S. Cl.
CPC ......... *H05B 6/1263* (2013.01); *H05B 6/1272* (2013.01); *H05B 2213/03* (2013.01); *H05B 2213/05* (2013.01)

(56) References Cited

U.S. PATENT DOCUMENTS

| | | | | |
|---|---|---|---|---|
| 2020/0154532 | A1 | 5/2020 | Kim et al. | |
| 2022/0295605 | A1* | 9/2022 | Corwin | H05B 3/74 |
| 2023/0021586 | A1* | 1/2023 | Corwin | H05B 6/1263 |
| 2023/0027830 | A1* | 1/2023 | Corwin | H05B 6/1218 |
| 2024/0167690 | A1* | 5/2024 | Moes | G09G 3/3208 |
| 2024/0206025 | A1* | 6/2024 | Moes | H05B 6/1254 |

FOREIGN PATENT DOCUMENTS

| | | | | |
|---|---|---|---|---|
| EP | 2670214 | A1 | 12/2013 | |
| EP | 3177108 | A1 | 6/2017 | |
| JP | 2009283306 | A | 12/2009 | |
| NL | 1014886 | C2 * | 10/2000 | H05B 6/04 |
| RU | 2542339 | C2 | 2/2015 | |
| WO | 9719298 | A1 | 5/1997 | |
| WO | 0035250 | A1 | 6/2000 | |
| WO | 2017093013 | A1 | 6/2017 | |
| WO | 2018178783 | A1 | 10/2018 | |
| WO | 2021142108 | A1 | 7/2021 | |
| WO | 2021142112 | A1 | 7/2021 | |

OTHER PUBLICATIONS

International Search Report for Application No. PCT/US2023/083803; mailed May 1, 2024; 3 pp.

International Search Report for Application No. PCT/US2020/063425; mailed Feb. 25, 2021; 2 pp.

* cited by examiner

INDUCTIVE COOKTOP COIL AND DISPLAY SYSTEM

CROSS-REFERENCE TO RELATED APPLICATION

This application claims priority under 35 U.S.C § 119(e) to U.S. Provisional Patent Application No. 62/944,160, filed Dec. 5, 2019, the disclosure of this prior application is considered part of this application and is hereby incorporated by reference in its entirety.

TECHNICAL FIELD

The present disclosure generally relates to an inductive coil and a display system, and more specifically to an inductive coil for use with an inductive cooktop.

BACKGROUND

Kitchens or other areas used to prepare and cook food may have an inductive cooktop, such as a cooktop that is part of a range unit or a separate cooktop unit that is placed on or installed directly in a countertop or other work surface. It is known that inductive cooktops can be used to effectively heat metal cookware that is capable of inductively coupling with an electromagnetic field generated by the cooktop.

It is common for inductive cooktops to have a top panel that supports cookware on the cooktop, such that during use, the top panel often is conductively heated by the inductively heated cookware. The residual heat at the top surface of the top panel is often dangerous to touch and is difficult and sometime unable to be visibly recognized. Presently known measures to indicate a hot top surface are provide by a lights adjacent to the hot area or with messages displayed on relatively small display screens at the front edge of the cooktop, which is frequently located away from the hot area of the top surface.

Attempts to incorporate displays or other electronics near to or overlapping the hot areas of the top panel can encounter several issues, such as those related the heat's negative affect on the operation of the display electronics and issue related to the magnetic fields generated by the induction coils interfering with operation of the display and other electronics.

SUMMARY

These and other needs are met by the present disclosure, which presents an induction coil and display system that can improve the use and operation of an inductive cooktop. The inductive cooktop has a top plate and an induction coil that is disposed below the top plate, where the induction coil operates to generate an electromagnetic field that can inductively couple with an object supported on the top plate, such as to heat a cookware object or to inductively transfer power to an electrical device. An illumination panel, such as a display panel, is disposed between the top plate and the induction coil, such as to illuminate or otherwise display images at the upper surface of the top plate, such as to display information to the user of the cooktop. The induction coil is configured to generate the electromagnetic field in an orientation and configuration relative to the display, such that the flux direction of the electromagnetic field is in general parallel alignment with critical lines of the display to prevent the electromagnetic field from inducing a voltage on the critical lines. This can reduce interference with the displayed images, such that the induction coil and overlapping portions of the display can be operated simultaneously.

In one or more implementations, an inductive cooktop includes a transparent panel, such as a glass panel, that supports a cookware object. An electrically actuated panel is disposed below or at an interior side of the transparent panel. The electrically actuated panel includes two sets of lines that are disposed orthogonal to each other to form a two-dimensional matrix that is configured to operate associated elements with an addressing scheme. For example, one set of lines may be data lines (i.e., high impedance lines) and the other set of lines may be scan lines (i.e., low impedance lines). Induction coils are disposed below the electrically actuated panel that are operable to generate an electromagnetic field that inductively couples with the cookware object supported at the transparent panel. The induction coils are operable to generate an electromagnetic field with a flux direction in general parallel alignment with one set of lines, such as the data lines, to prevent the electromagnetic field from inducing a voltage on the lines.

In some implementations, the electrically actuated panel may include illumination elements that are connected to the two-dimensional matrix, such as to provide an illumination panel or display panel or the like. For example, the display panel may be an organic light emitting diode (OLED) display panel, a thin-film-transistor liquid-crystal display (TFT LCD) panel, a light-emitting diode display (LED) panel, a plasma display panel (PDP), a liquid-crystal display (LCD) display panel, a quantum dot display (QLED) panel, or an electroluminescent display (ELD) panel or the like. In other examples, the two-dimensional matrix of the electrically actuated panel may incorporate or connect to an array of sensing elements, such as for a capacitive touch screen, or thermal sensors, such as for a temperature sensing surface. These alternative examples may similarly operate the elements with addressing schemes that rely on critical lines of the matrix. Thus, it is understood that in addition to cooktop devices, the present disclosure encompasses implementations of the inductive coils described herein in other systems and devices.

In some aspects, the induction coils are provided with opposing poles (i.e., north and south poles) directed toward or facing the electrically actuated panel, such as to orient at least the portion of the resulting magnetic field that intersects with the electrically actuated panel with the flux direction substantially parallel to the critical lines. To provide the opposing poles in such a configuration, each induction coil may be shaped to form an open-core coil, such as a C-core coil or an E-core coil. For example, the induction coils may include a base portion and pole portions protruding from opposing ends of the base portion, where the base and pole portions comprise a ferrite material. Further, windings may be disposed around the base portion to define the north and south poles at the pole portions.

In some implementations, a thermal gap is disposed between the transparent panel and the electrically actuated panel to prevent heat generated at the cookware object from heating the electrically actuated panel above a threshold operating temperature. The thermal gap may include transparent insulator, such as a gas, liquid, or solid state insulation, such as a silica aerogel material. In the case of gas or liquid, the insulating material may flow through the thermal gap to assist with removing heat and preventing heat transfer. Further, in some examples, a cooling system may be connected with the induction coil for cooling the induction coils below a threshold temperature and similarly preventing heat transfer to the electrically actuated panel.

Another aspect is an inductive cooktop that includes a top plate and induction coils disposed below the top plate, such as in an array of rows and columns of induction coils. The top plate may be configured to support an object, such as cookware that comprises a ferrous metal. An illumination panel, such as a display panel, is disposed between the induction coils and the top plate and operates to emit light through the top plate. The illumination panel includes data lines (i.e., high impedance lines) disposed orthogonal to scan lines (i.e., low impedance lines). For example, the data lines may be disposed vertically or longitudinally (i.e., in a column) on the illumination panel and the scan lines may be disposed horizontally or laterally (i.e., in a row) on the illumination panel. The induction coils are operable to generate the electromagnetic fields with a flux direction in general parallel alignment with the data lines, such as to reduce interference between the electromagnetic fields and signals propagating along the data lines.

In some examples, a controller is configured to control a frequency and an intensity of electromagnetic fields generated by each of the induction coils. The controller may also, for example, determine whether a cookware object is present above each of the induction coils. Based on the determination of whether the cookware object is present above an induction coil, the controller may control the frequency and the intensity of the electromagnetic field of the corresponding induction coil. In some aspects, the controller may cause electromagnetic fields to be emitted or increase the intensity of the electromagnetic fields emitted by only a portion of the induction coils in response, at least in part, to determining that a cookware object is present above the portion of the induction coils. For example, the controller may transmit a probe signal to each induction coil to determine whether a cookware object is present above the corresponding induction coil. The probe signal may be a frequency that is different from a resonant frequency of each coil.

In some aspects, such as with the induction coils arranged in an array of adjacent columns, the controller increases the intensity of the electromagnetic fields generated by at least two of the induction coils within the same column to increase a resonant frequency of the at least two induction coils within the same column.

In some implementations, the cookware object may include packaging or various types of cooking vessels, such as a pot, a pan, an induction plate, a wok, and the like. The illumination panel, such as a display, may operate to emit light through the top plate, such as to display graphics and information at the upper surface of the top plate. Before, during, or after operation of the induction coil, the display may display information that is visible at the upper surface of top plate, such as information related to hot areas of the upper surface, operational information of the cooktop, or other media or advertising or the like.

In some implementations, the top plate may have an upper glass panel, a lower glass panel in planar parallel alignment with the upper glass panel, and a transparent thermal insulator disposed between the upper and lower glass panels. The glass panels may include a glass-ceramic, silica glass, porcelain, polymer thermoplastic, among other types of glass and the transparent thermal insulator may be a silica aerogel material, fluid or air flow, or the like.

In some implementations, the upper surface of the top plate may have a cooking area that is defined by an overlapping portion of the magnetic field at the upper surface. When a cookware object is placed on the cooking area and inductively coupled with the induction coil, the display may be controlled to display information at an interfacing portion of the cooking area that interfaces with the cookware object.

Another aspect is a system that has a transparent panel, at least one induction coil, and an electrically actuated panel disposed between the transparent panel and the at least one induction coil. The electrically actuated panel is disposed in planar parallel alignment with the transparent panel. Further, the electrically actuated panel includes a first set of lines and a second set of lines disposed orthogonal to each other to form a two-dimensional matrix that is configured to operate associated elements with an addressing scheme. The at least one induction coil is operable to generate an electromagnetic field that extends through the electrically actuated panel and transparent panel. The electromagnetic field has a flux direction in general parallel alignment with the second set of lines to prevent the electromagnetic field from inducing a voltage on the second set of lines.

In some examples, the electrically actuated panel includes a plurality of illumination elements connected to the two-dimensional matrix, such as to provide a display panel having scan lines and data lines. As such, the first set of lines may be scan lines and the second set of lines may be the data lines.

In some implementations, the transparent panel is horizontally disposed for an upper or exterior surface thereof to provide a countertop surface. The induction coil is configured to generate an electromagnetic field that inductively couples with an object, such as cookware, supported at an exterior surface of the transparent panel. For example, the transparent panel may be horizontally disposed in a kitchen in generally parallel alignment with the floor. In other examples, the transparent panel may be alternatively oriented, such as in a vertical orientation, where the induced object at the exterior surface of the transparent panel may be an electrical device, such as a power outlet module or the like.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals in the various drawings indicate like elements.

DETAILED DESCRIPTION

The present disclosure provides an inductive cooktop and corresponding system for operating an induction coil in a manner that generates an electromagnetic field that inductively couples with cookware on the cooktop and prevents voltage from being induced on critical lines of the interposed electrically actuated panel, such as data lines of a display panel. Although certain embodiments and examples are described below, those skilled in the art will recognize that the inventive concepts extends beyond the specifically disclosed embodiments and/or uses and obvious modifications and equivalents thereof. Thus, it is intended that the scope of the inventive concepts presented herein should not be limited by any particular embodiments described below.

Figure 1:
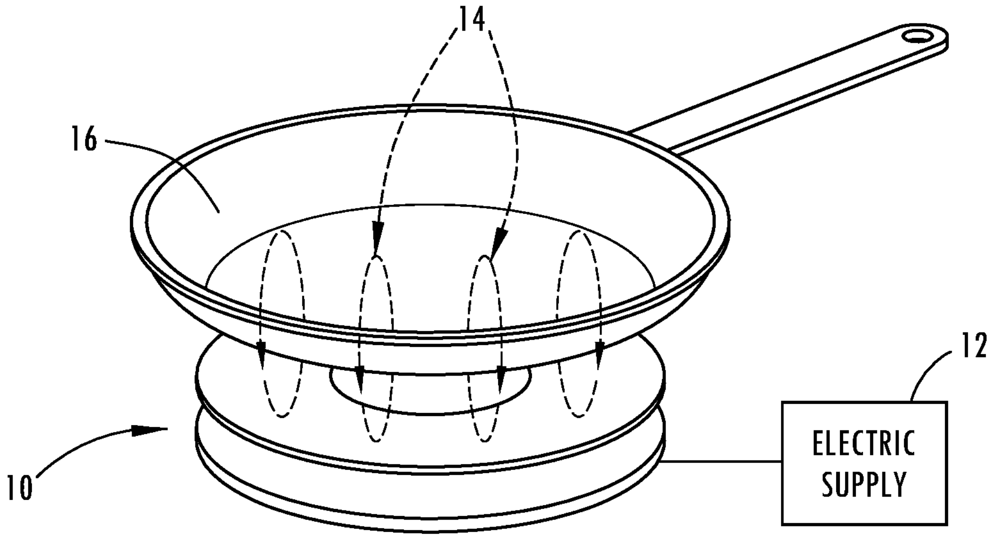
FIG. 1 is a perspective view of a disc-shaped induction coil disposed below a pan resting on an inductive cooktop.
Figure 2:
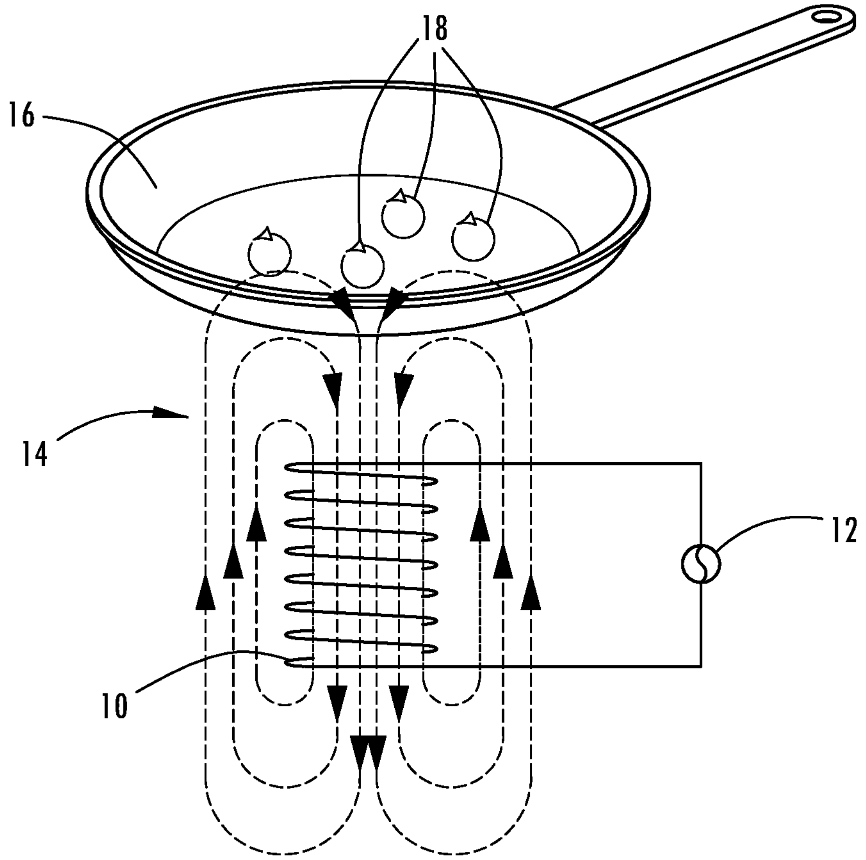
FIG. 2 is a schematic view of a magnetic field generated by an induction coil to heat a pan on an inductive cooktop.

Referring now to FIGS. 1 and 2, typical inductive coils used in heating applications, such as cooktops, are circular or cylindrical coils 10 such as "pancake" or Archimedes coils wrapped around a magnetic core (e.g., a ferromagnetic material). These coils may be supplied with high frequency alternating current (AC) from an electrical supply 12, such that, in response to the AC, a rapidly changing magnetic field 14 is generated. This electromagnetic field 14 penetrates the object to be heated (e.g., the cookware object 16) and generates eddy currents 18 within the object. Resistance to the eddy currents 18 within the object 16 generate heat, which in turn heats the object.

Figure 3:
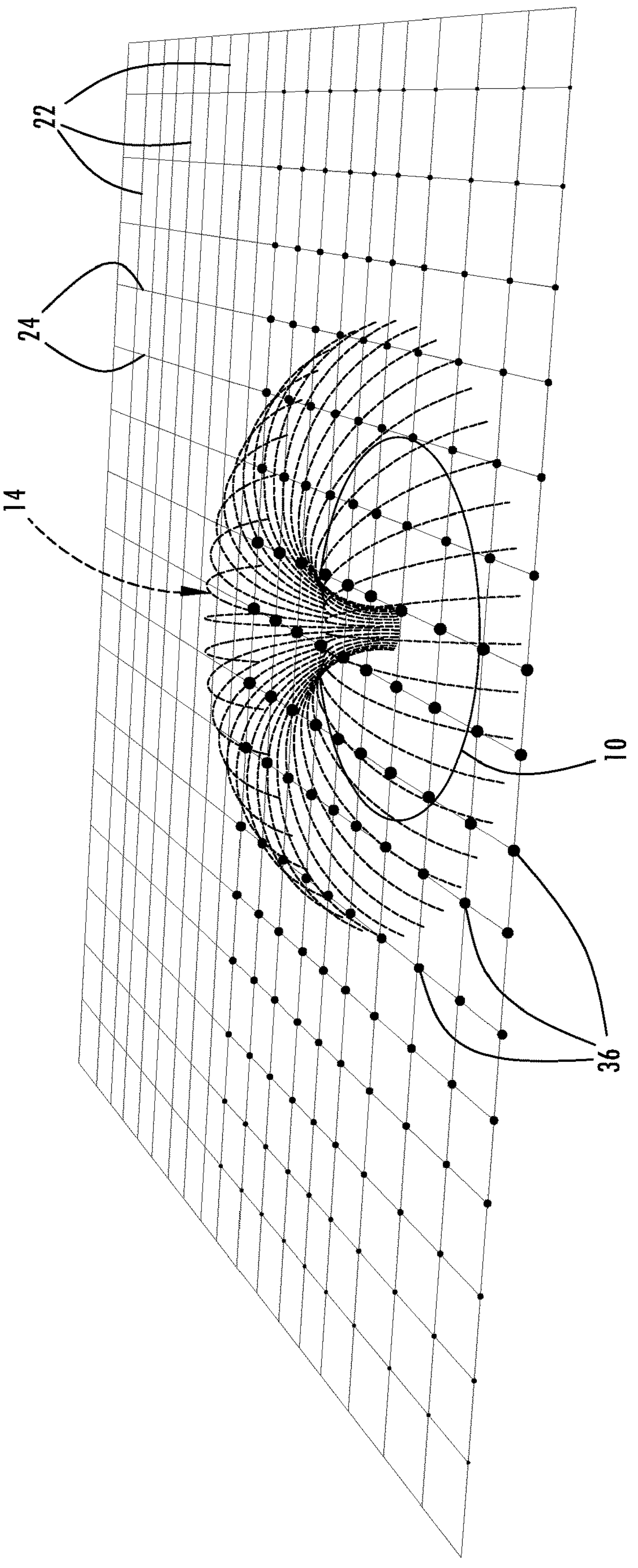
FIG. 3 is a perspective view of a magnetic field generated by a disc-shaped induction coil that passes through a display panel and induces a voltage at elements of the display panel.

As illustrated in FIG. 3, the cylindrical coil 10 generates the magnetic field 14 with a toroidal shape. The magnetic field 14 extends upward from the coil 10 through a plane that is depicted as a grid in FIG. 3 to show a two-dimensional matrix 20 of an electrically actuated panel, such as to represent data lines 22 and scan lines 24 of an illumination panel, such as a display panel. The two dimensional matrix may be configured to operate associated elements with an addressing scheme, such as active or passive matrix addressing. For example, the electrically actuated panel may include illumination elements that are connected to the two-dimensional matrix 20, such as at the intersections of the data and scan lines to provide an illumination panel or display panel or the like. In other examples, the two-dimensional matrix of the electrically actuated panel may incorporate or connect to an array of sensing elements, such as for a capacitive touch screen, or thermal sensors, such as for a temperature sensing surface. These alternative examples may similarly operate the elements with addressing schemes that rely on critical lines of a matrix.

Figure 4:
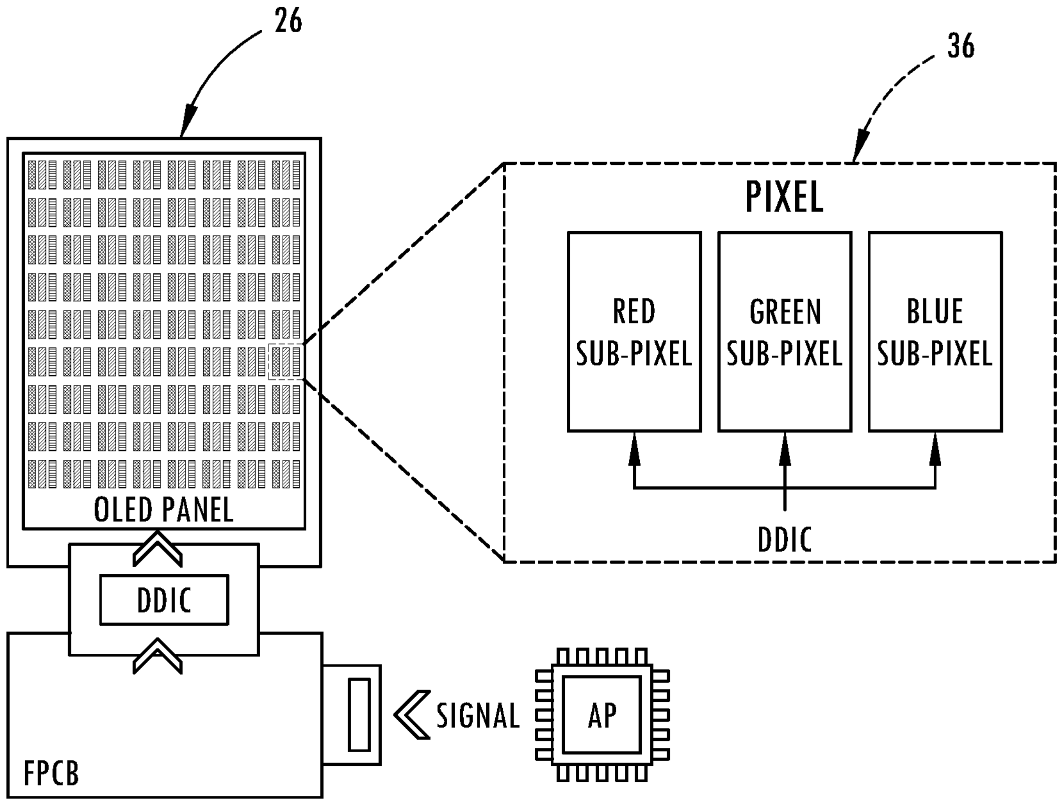
FIG. 4 is a schematic diagram of a OLED display panel.
Figure 5:
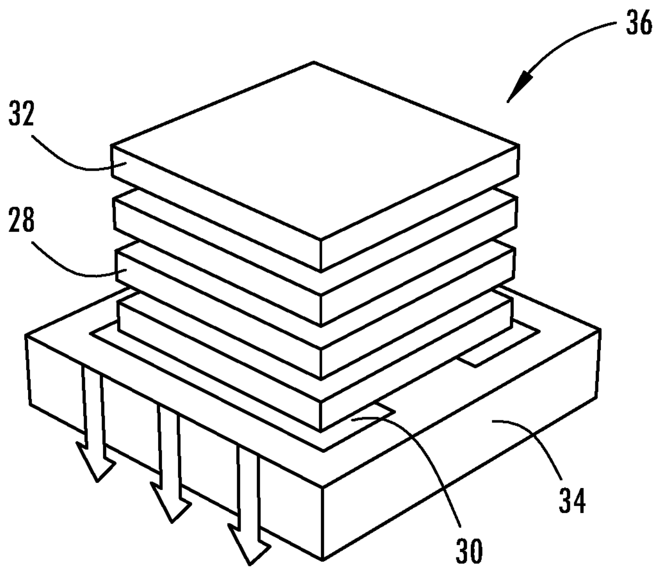
FIG. 5 is an enlarged perspective view of a pixel of an OLED display panel.
Figure 6:
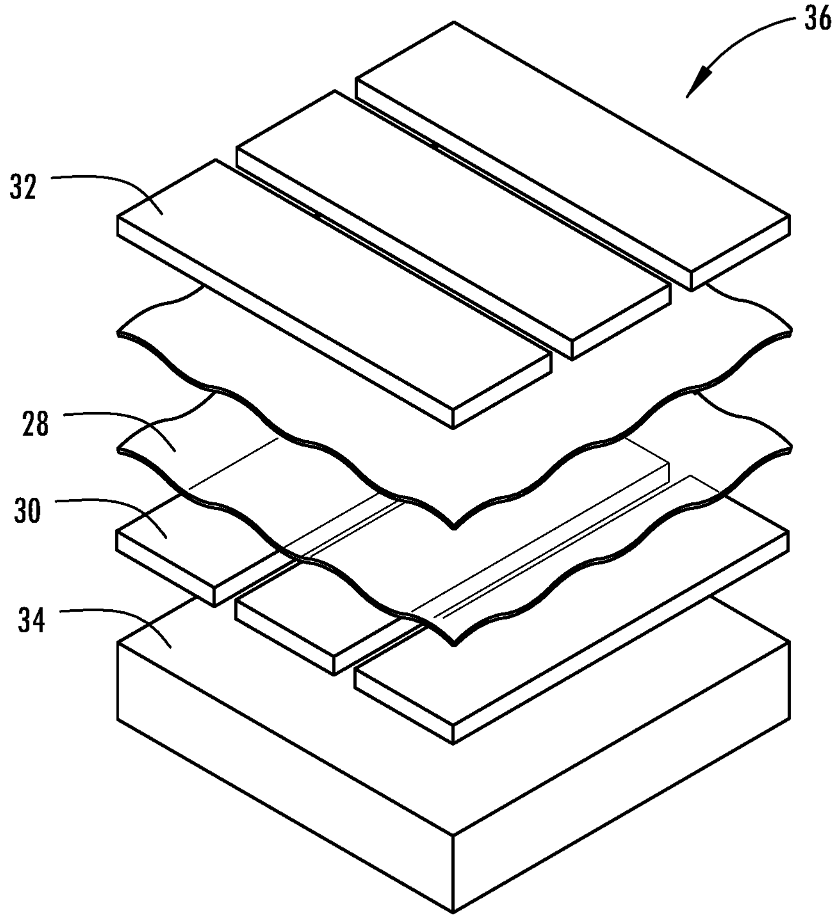
FIG. 6 is an exploded perspective view of a pixel of an OLED display panel.

With reference to FIGS. 4-10B, in some implementations, the electrically actuated panel is a display panel, shown as an OLED display panel 26 (FIG. 4). In an OLED display panel, the elements or LEDs include a film of organic compound that emit light in response to an electric current. Because the LEDs emit visible light, a backlight is not needed. This helps allow the display to be thin, and in some examples, partially transparent. Each pixel 36 of the display panel 26 may include a red sub-pixel, a green-sub pixel, and a blue sub-pixel (FIG. 4). As illustrated in FIGS. 5 and 6, the organic compound layer(s) 28 is sandwiched between an anode 30 and cathode 32, which all rests on a substrate 34.

Figure 7:
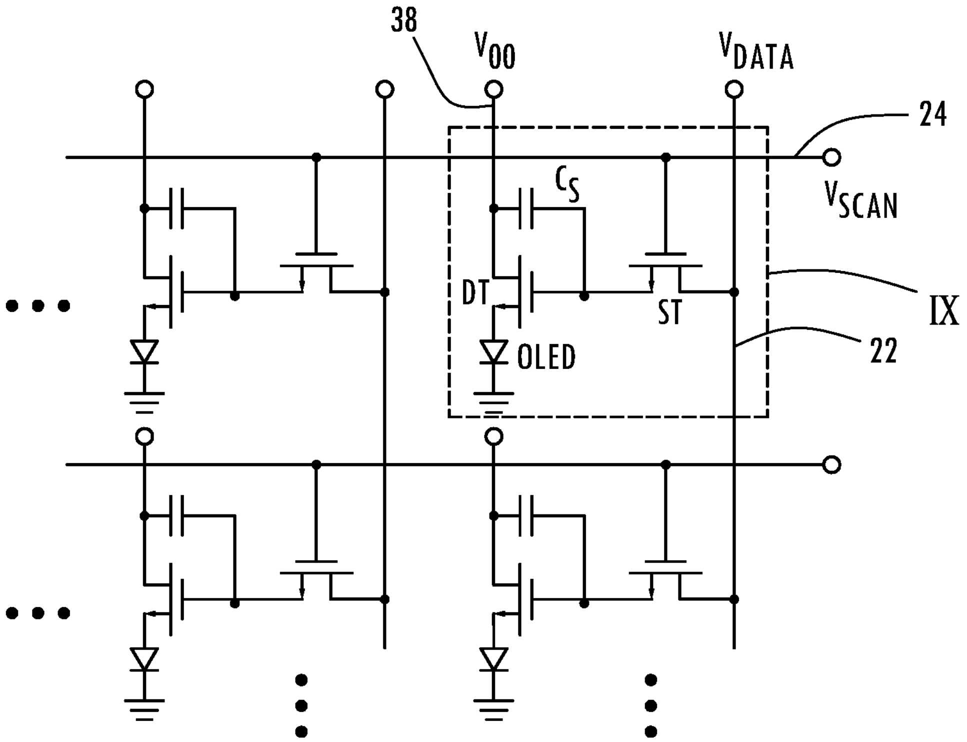
FIG. 7 is a circuit diagram of a portion of an OLED display panel.
Figure 8:
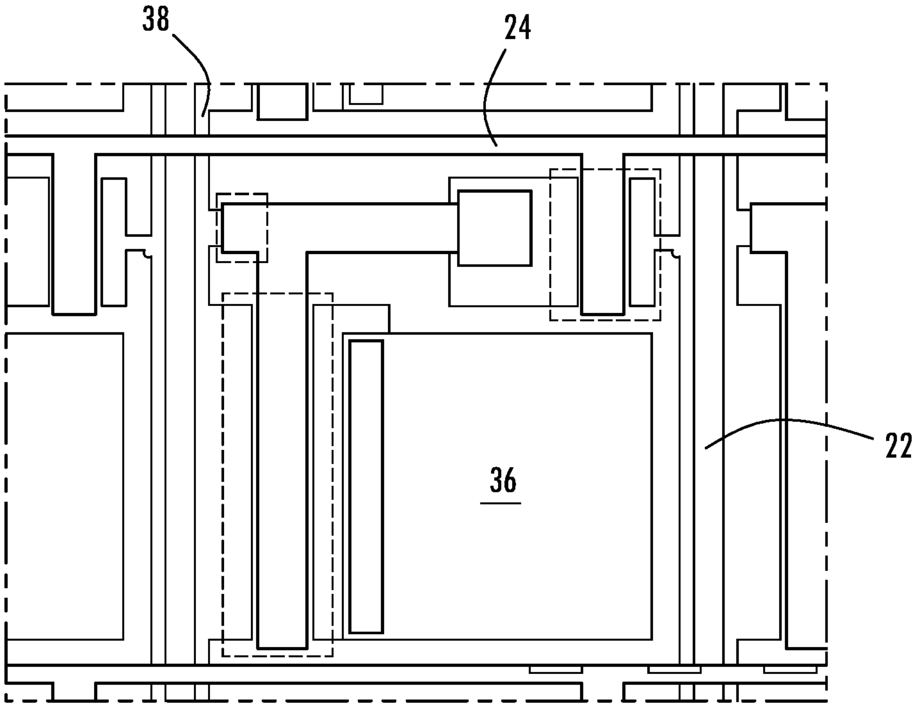
FIG. 8 is an enlarged schematic view a portion of the OLED display, taken from section IIX show in FIG. 7.
Figure 9:
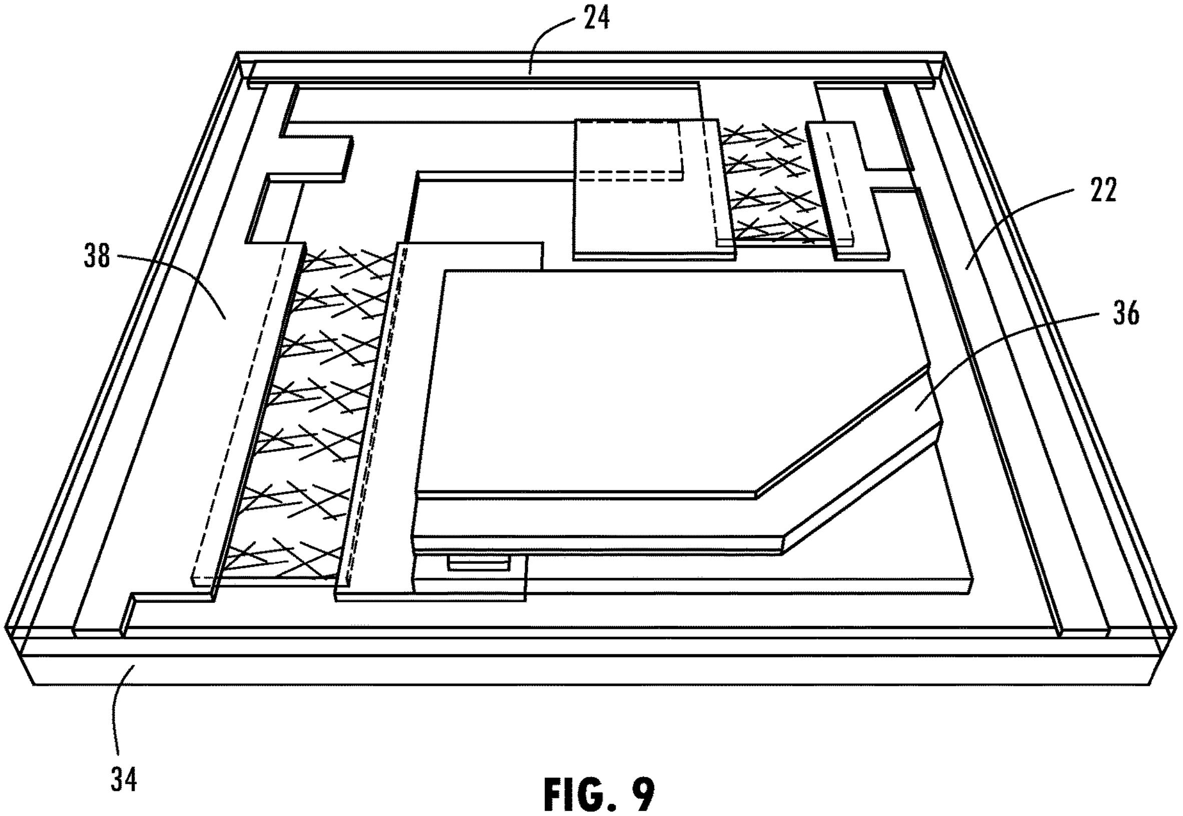
FIG. 9 is a perspective view of the portion of the OLED display shown in FIG. 8.
Figure 10A:
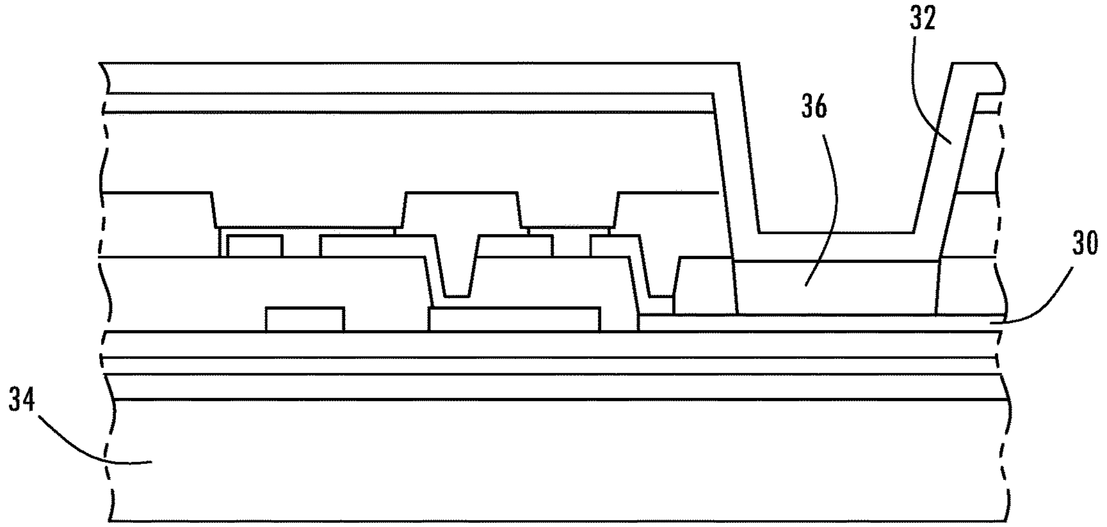
FIGS. 10A and 10B are sectional views of the portion shown in FIG. 9.
Figure 10B:
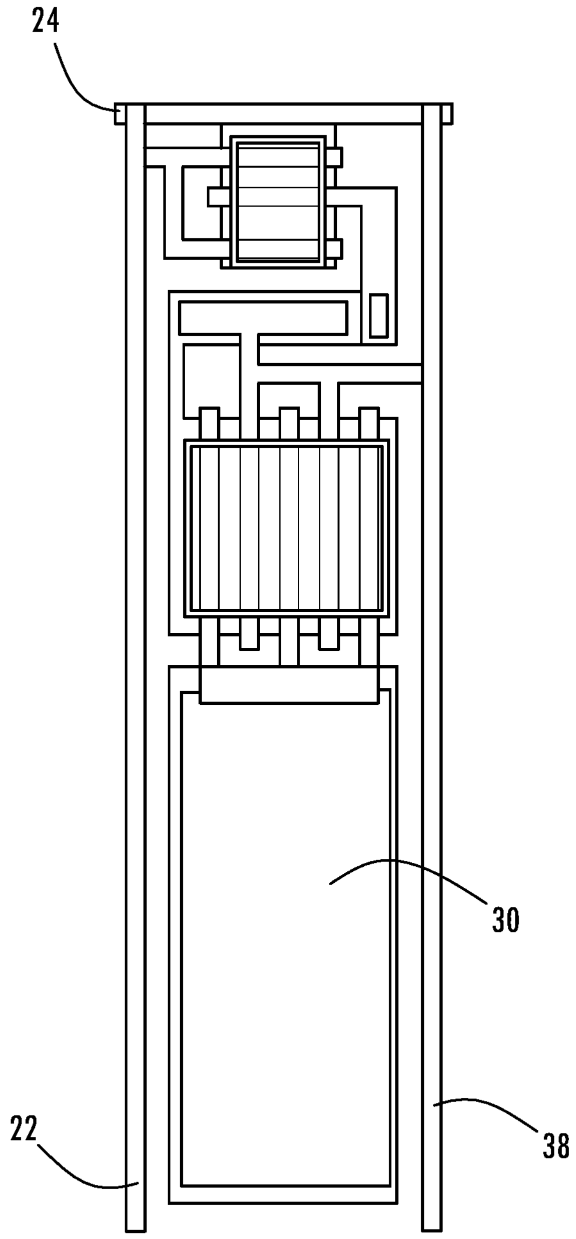

As illustrated in FIGS. 7-9, each OLED is controlled by the data line 22 and the scan line 24. The scan line 24 may activate or enable rows of pixels (i.e., OLEDs) along the display sequentially, while the data line 22 may provide the appropriate voltage or current to control the intensity of the output of the pixel (e.g., via a switching transistor and a driving transistor respectively). Because the data line 22 may control the intensity of the OLED via the voltage or current applied to the gate of the driving transistor, the data line 22 is susceptible to noise and interference. Voltage coupled onto the data line 22 may result in the OLED emitting an incorrect amount of light (e.g., more or less light than expected). In some examples, coupled noise may cause OLEDs (or pixels 36) that should remain dark to emit light, such as shown in FIG. 3.

Most displays (e.g., OLED displays) typically have a continuous cathode for a current return. The continuous cathode is a sheet of relatively thin metal on a layer below the active electronics of the display. In some implementations, the display of the inductive cooktop uses individual wires for cathodes instead of a sheet instead of a continuous cathode. That is, the display may include individual cathode ground wires 38. This allows for the display to be partially transparent to both light and electromagnetics.

Referring again to FIG. 3, due to the nature of the magnetic field 14 generated by spiral coils 10, i.e., the toroidal shape, some of the generated electromagnetic field is orthogonal to and intersecting data lines 22 and thus induces a voltage along these data lines 22. The induced voltage, in some cases, may activate or enable LEDs 36 controlled by the data line 22, and in other cases, may damage the data lines or other connected circuitry due to the intensity of the magnetic fields. As shown in FIG. 3, the LEDs 36 on the data lines 22 intersecting the magnetic field 14 are activated and illuminated with the highest intensity directly in the magnetic field 14 and dissipating in light intensity moving away from the magnetic field 14 along the affected data lines 22. Thus, use of a spiral coil below a display (e.g., an OLED display) is undesirable due to the interference or damage the magnetic fields generated by the spiral coils will cause the display.

Referring now to FIGS. 11-24, an inductive cooktop 100 may be provided in a kitchen or other area used to prepare and cook food, such shown in FIGS. 11-14 and installed in a countertop 102, such as shown provided on a kitchen island. The inductive cooktop 100 has a top plate 104 and at least one induction coil 106 (FIG. 15) that is disposed below the top plate 104. A power supply may supply current, such as high-frequency or medium-frequency alternating current, to the induction coil 106 to create an electromagnetic field 108 that can inductively couple with and heat a cookware object 116 supported on an upper surface of the top plate 104. The electromagnetic field 108 (FIG. 16A) may permeate through the upper surface of the top plate 104 in the area immediate above the induction coil 106. The electromagnetic field 108 oscillates to create eddy currents in or near the bottom portion of the cookware object 116 that is supported on the top plate 104, such that the resistance of the cookware object to the eddy currents causes resistive heating of the cookware object 116. Thus, the inductively heated cookware object 116 may heat and cook the contents of the cookware. To adjust cooking settings, such as temperature, the current supplied to the induction coil 106 may be adjusted.

The cookware object 116 may include a ferrous metal, such as at least at a base of the cookware, to be capable of inductively coupling with the induction coil 106 and conductively spreading the heat to the cooking surface. Also, the cookware object 116 may include various types of cooking vessels, such as a pot, a pan, an induction plate, a wok, and the like. It is also contemplated that the cookware object may be product packaging, such as a metal food packaging that is configured to be used without an underlying piece of cookware. Further, it is contemplated that the object may be an electrical device that is configured to inductively couple with the invention coil to transfer data or power via the inductive coupling. Such an electrical device may include a small kitchen appliance, such as a toaster or blender, a receptacle unit for plugging in other devices powered via electrical wires, or other personal electronic devices, such as cell phones.

Figure 12:
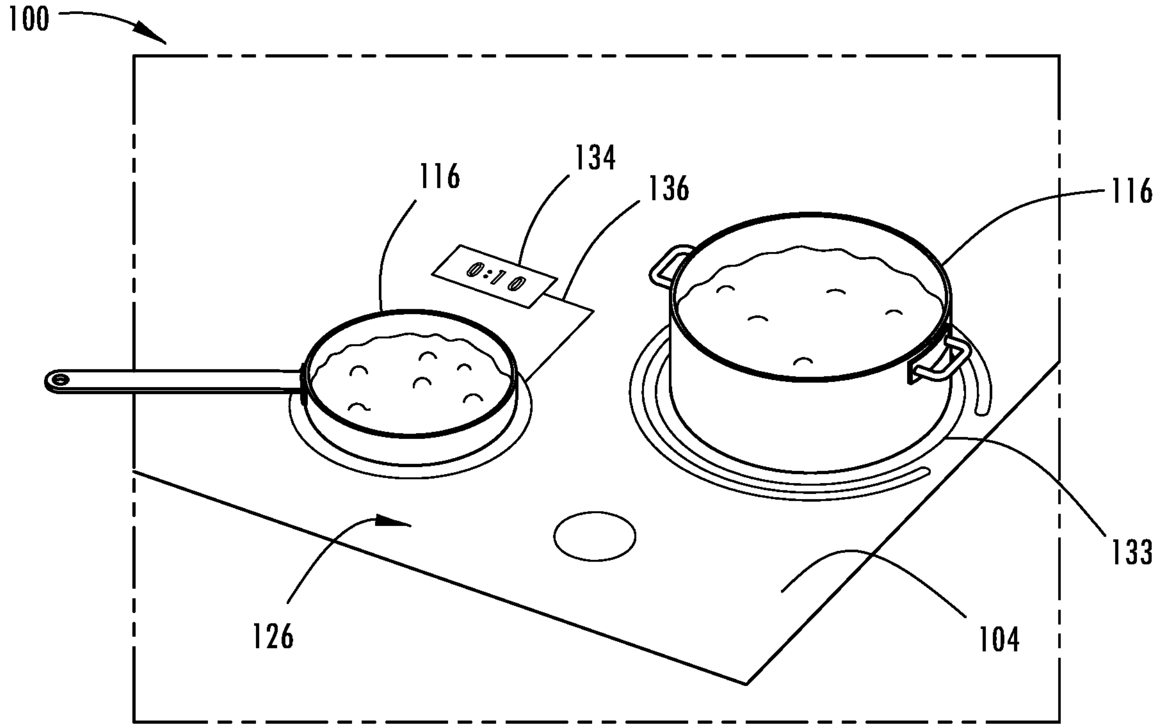
FIG. 12 is an enlarged perspective view of the inductive cooktop shown in FIG. 11, showing cookware on the inductive cooktop and a display panel displaying information.
Figure 13:
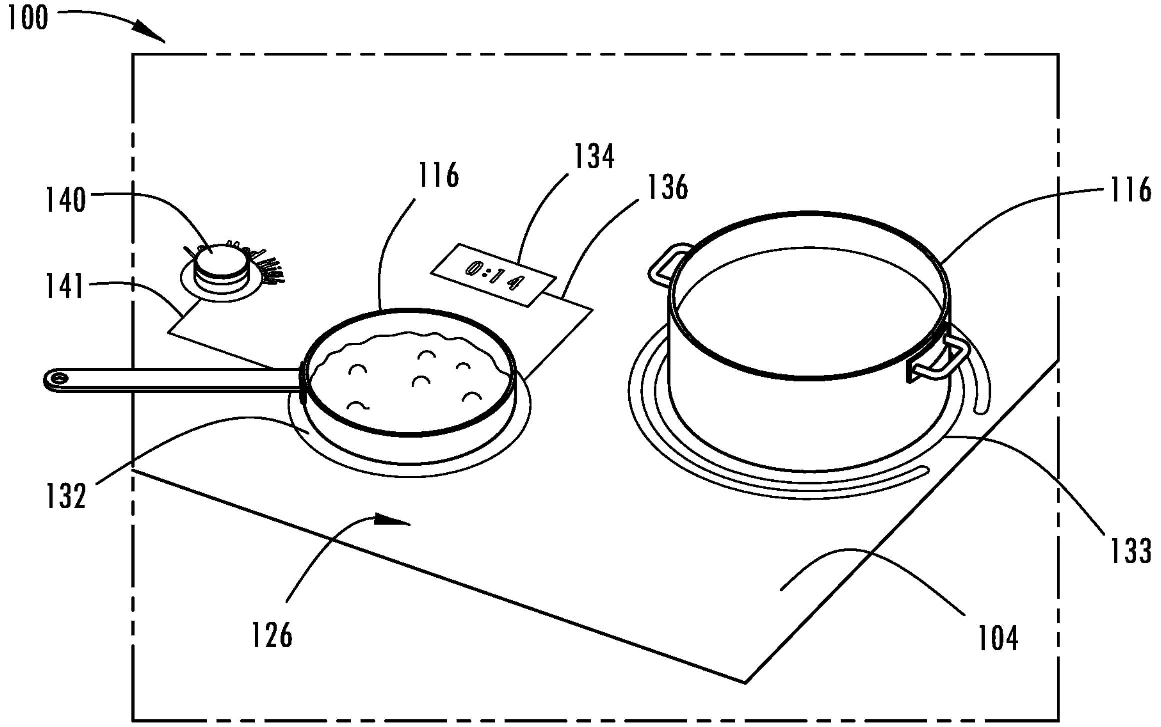
FIG. 13 is a perspective view of the inductive cooktop shown in FIG. 12, showing user interaction with the displayed content at the upper surface of the inductive cooktop.
Figure 14:
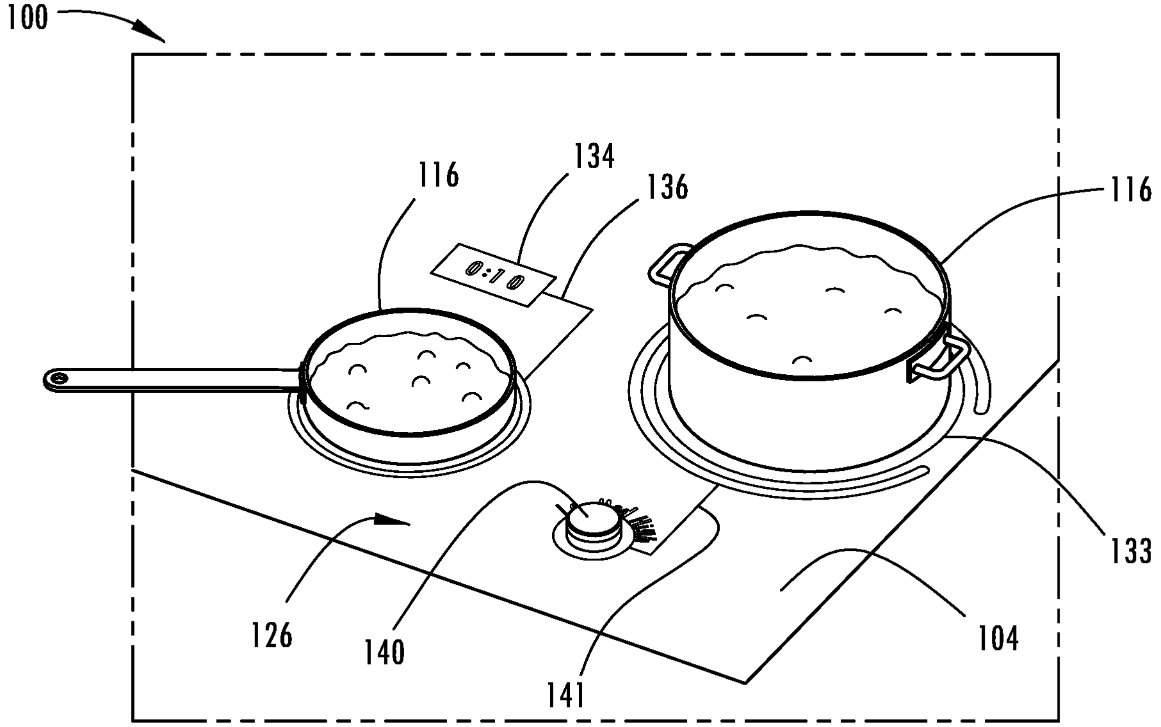
FIG. 14 is a perspective view of the inductive cooktop shown in FIG. 13, showing the rotatable knob moved to a different location on the upper surface of the inductive cooktop.

A display panel 126 may be disposed between the induction coil 106 and the top plate 104 and may operate to emit light through the top plate 104, such as to display graphics and information at the upper surface of the top plate 104, such as shown in FIGS. 12-14. The display panel 126 may be an organic light emitting diode (OLED) display. It is also contemplated that other types of displays may be utilized in additional implementations of the inductive cooktop, such as a thin-film-transistor liquid-crystal display (TFT LCD) panel, a light-emitting diode display (LED) panel, a plasma display panel (PDP), a liquid-crystal display (LCD) display panel, a quantum dot display (QLED) panel, or an electroluminescent display (ELD) panel or the like. For examples the LED display may be a traditional light emitting diode (LED) display, a quantum light-emitting diode (QLED) display, an active-matrix organic light-emitting diode (AMOLED) display, and a micro-LED display or the like.

As shown in FIGS. 12-14, the inductive cooktop 100 may include a controller, such as control system circuitry, that is coupled with and in communication with the induction coil(s) 106 and the display 126 for the controller to control the display 126, such as to display information at the upper surface of the top plate 104, including at an area or areas of the upper surface that interface with a cookware object 116 that is inductively coupled with one or more of the induction coils 106. Information may be displayed at the display, including at the area of the display between the inductive coil and top plate before, during, or after operation of the induction coil inductively coupling with a cookware object. The displayed information may include operational information of the cooktop, outlines of cooking zones or control interfaces, control interfaces images, media widows or information, or branding or advertising windows or information and other conceivable images and graphics. For example, as shown in FIGS. 12-14, the display 126 displays a timer 134 with a lead line 136 that connects the timer 134 to the displayed heating indicator, shown as a red circle 132 that corresponds to the cooking zone.

In some implementations, the upper surface of the top plate 104 may have a cooking area that is defined by an overlapping portion of the magnetic field at the upper surface. Such a cooking area may be a zone dedicated for a single cookware object, such as a circular area for a specifically sized pot or pan, or may be a zone that is adaptable to inductively couple a various locations within the cooking area, such as with differently shaped and sized cookware objects. When a cookware object is placed on the cooking area and inductively coupled with the induction coil, the display 126 may be controlled to display information at an interfacing portion or zone of the cooking area that interfaces with the cookware object 116.

As further shown in FIGS. 12-14, the inductive cooktop 100 may include an interface device 140 that may be removable and selectively attached to the upper surface of the top plate 104 at a selected use location, such as adjacent to a portion or zone of the cooking area that interfaces with a cookware object 116. For example, the interface device 140 may be attached near one of the cookware objects 116 (FIG. 13), where a lead line 141 is displayed to connect the interface device 140 with the image 132 displayed beneath cookware object 116. As such, the inputs provided to the interface device 140 may be used to control the inductive coil or coils and the cooking settings in the zone occupied by the displaced image 132. The interface device 140 may also be attached near the other cookware object 16 (FIG. 14), where a lead line 141 is displayed to connect the interface device 140 with the image 133 displayed beneath cookware object 116. Similarly, the inputs provided to the interface device 140 shown in FIG. 14 may be used to control the inductive coil or coils and the cooking settings in the zone occupied by the displaced image 133, such as indicated by the lead line 141.

The display may also display information around the interface device 140, such as "Lo Med High" as shown in FIGS. 13 and 14, to correspond with the types of information that may be input. In some implementations, the interface device 140 may magnetically attach at the upper surface of the top plate 104 and may include a rotatable knob or dial that is rotatable to provide user inputs that correspond with a radial position of the rotatable knob, such as to adjust temperature or cooking time or the like. It is also contemplated that the interface device may be configured with additional or alternative input devices, such as button, capacity touch sensor, slider, switch, or the like to provide user inputs to the controller of the inductive cooktop. It is further contemplated that areas of the display (generally away from the cooking area) may have a touchscreen overlay to provide additional inputs to the inductive cooktop Also, such as shown in FIGS. 12-14, the top plate 104 of the cooktop 100 may function as a counter surface that is capable of easily being wiped clean of liquids, sauces, or other materials that may splash onto the upper surface from activities performed at the working surface of the countertop, cooktop, or sink or the like.

Figure 15:
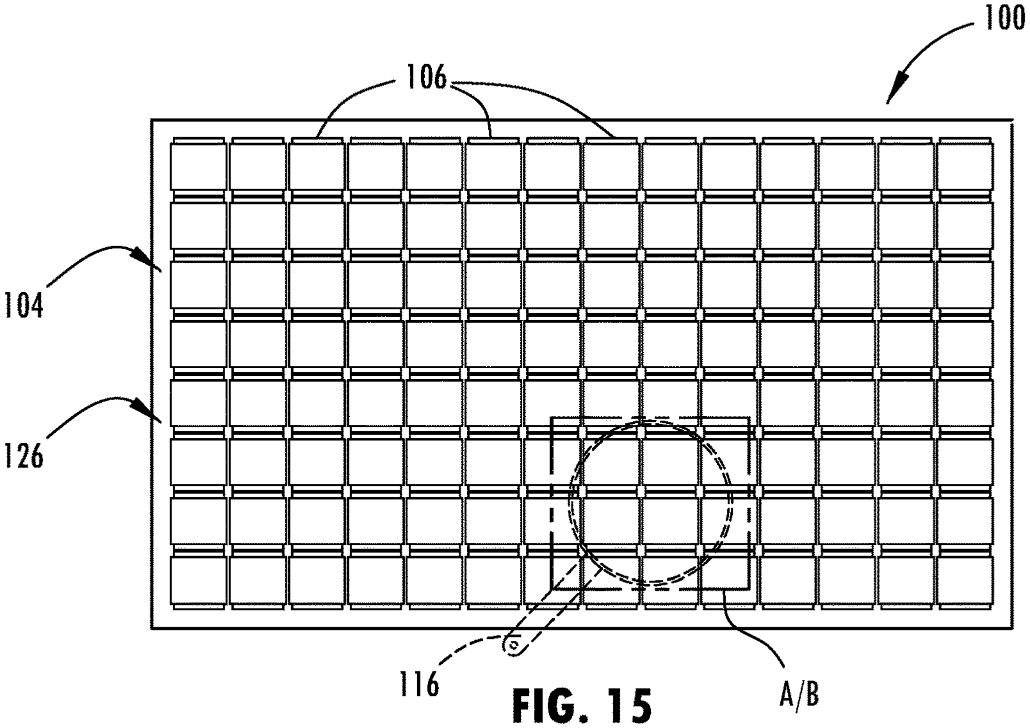
FIG. 15 is a top plan view of an inductive cooktop, showing an array of induction coils and a pan placed on the inductive cooktop.
Figure 15A:
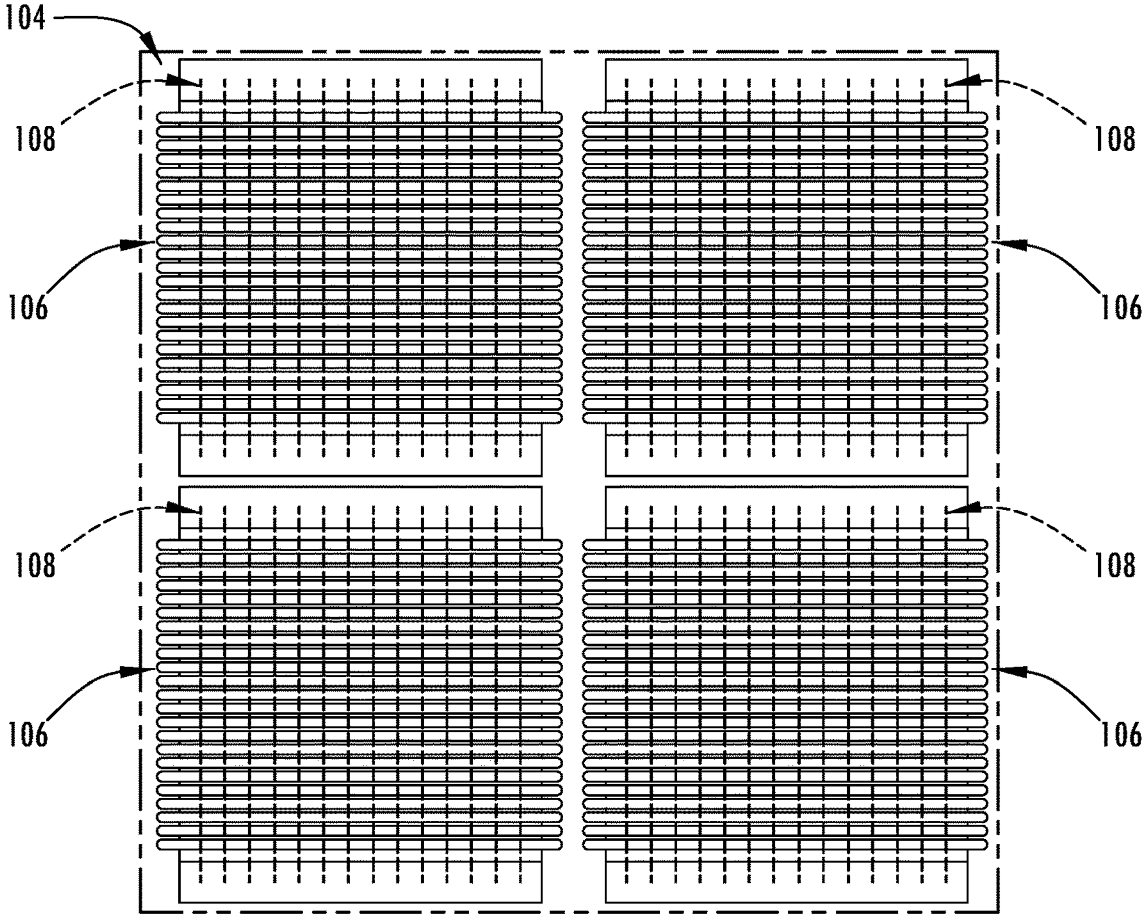
FIG. 15A is an enlarged view plan view of the induction coils taken at section AB shown in FIG. 15 and showing the magnetic fields generated by the illustrated induction coils.
Figure 15B:
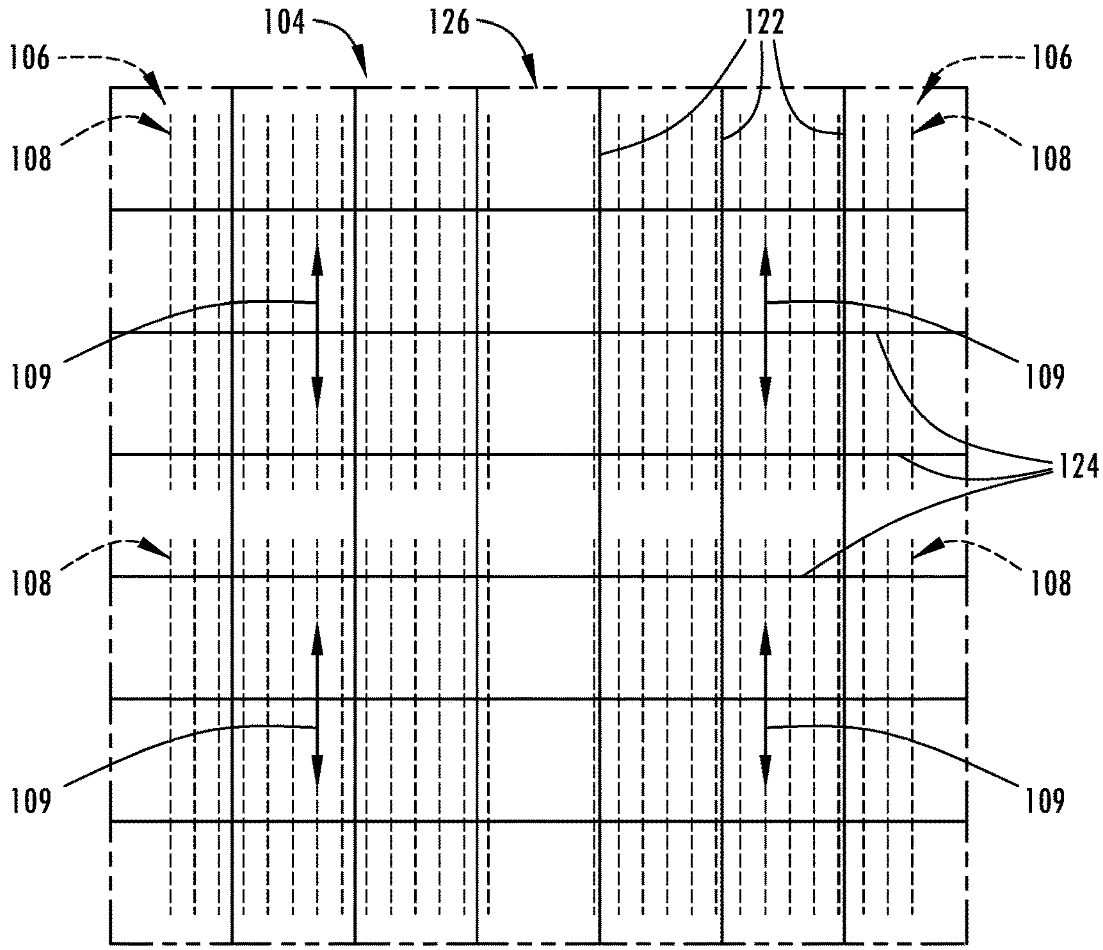
FIG. 15B is an enlarged view plan view of the induction coils taken at section A/B shown in FIG. 15 and schematically showing the magnetic fields aligned with the data lines of the display panel.
Figure 16:
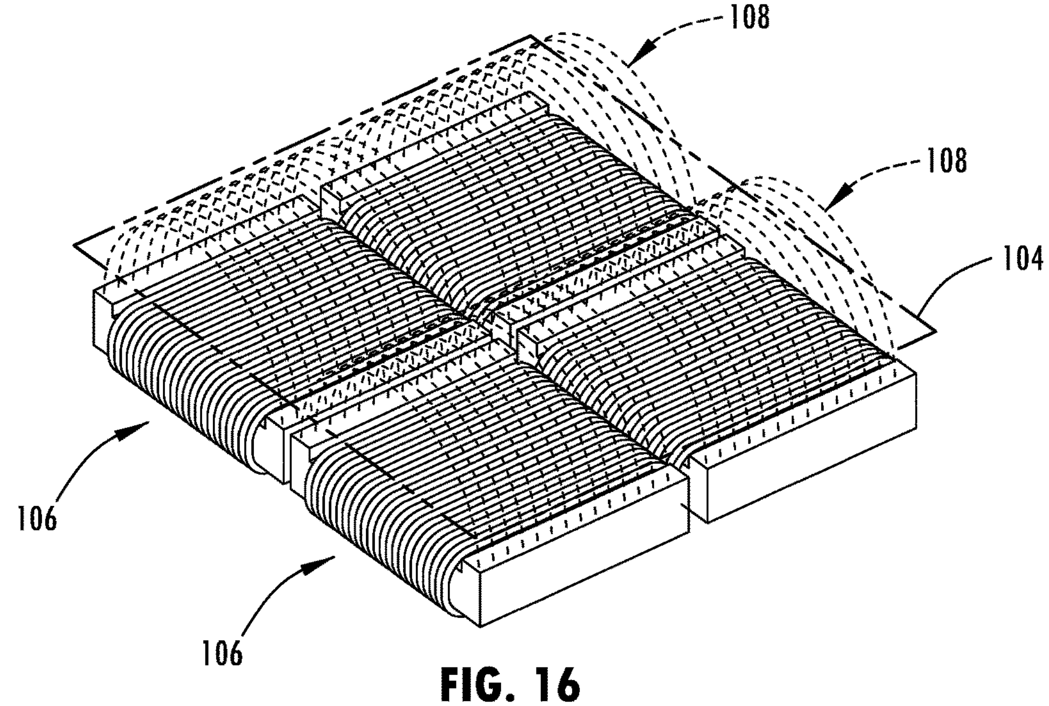
FIG. 16 is a perspective view of the induction coils taken at section A/B shown in FIG. 15 and the corresponding magnetic fields.

Referring now to FIGS. 15-16, an inductive cooktop 100 includes a transparent panel, such as a top plate 104, that supports a cookware object 116. The top plate 104 may be a glass ceramic panel or the like. An electrically actuated panel, shown as a display panel 126 is disposed below or at an interior side of the top plate 104. As shown in FIG. 15B, the display panel 104 includes two sets of lines 122, 124 that are disposed orthogonal to each other to form a two-dimensional matrix that is configured to operate associated elements with an addressing scheme. One set of lines are data lines 122 (i.e., high impedance lines) and the other set of lines are scan lines 124 (i.e., low impedance lines). The data lines 122 are shown in FIG. 15B, when viewed in the Z-direction from above, disposed vertically or longitudinally (i.e., in a column) on the display panel 104 and the scan lines 124 are disposed horizontally or laterally (i.e., in a row) on the display panel 104. The electrically actuated panel may be various types of illumination panels or other types of panels in other implementations of the inductive coils described herein.

As further shown in FIGS. 15-16, the induction coils 106 are disposed below the display panel 126 that are operable to generate an electromagnetic field 108 that inductively couples with the cookware object 116 supported at the transparent panel. To avoid interference or damage to the data lines 122, induction coils 106 may emit a magnetic field 108 that is largely parallel to the data lines 122, and thus will minimize any induced voltage or current on the data lines 122. As shown in FIG. 15B, the induction coils 106 are operable to generate the electromagnetic fields 108 with a flux direction 109 in general parallel alignment with the data lines 122 to generally prevent the electromagnetic fields 108 from inducing a voltage on the data lines 122.

In some aspects, the induction coils are provided with opposing poles (i.e., north and south poles) directed toward or facing the electrically actuated panel, such as to orient at least the portion of the resulting magnetic field that intersects with the electrically actuated panel with the flux direction substantially parallel to the critical lines. To provide the opposing poles in such a configuration, each induction coil may be shaped to form an open-core coil, such as a C-core coil or an E-core coil. An open-core coil, for purposes of this disclosure, may be generally understand as a coil shape with the characteristic that it orients the magnetic field in a common direction with flux direction that is capable of being generally aligned with a linear wire. In some examples, the open-core coil may include an integrated array of miniature C-shaped coils and multiple windings that provides a complex unitary structure that generates a corresponding array of magnetic fields that are substantially parallel with each other.

In some implementations, the inductive cooktop may include one or more C-core coils 106 (which also may be referred to as "horseshoe" coils) as illustrated in FIGS. 15-17A. The windings of the C-core coil generate a magnetic field that is generally oriented in the same direction, and thus the C-core coil may be disposed within the inductive cooktop such that the direction of the magnetic field generated by each C-core coil is parallel to the data lines to avoid inducing current onto the data lines. That is, the north and south poles of the C-core coils 106 may be aligned parallel with the data lines of the display. While the illustrated example shows a C-core coil, other coil shapes that generate magnetic fields substantially in the same direction may also be used (e.g., E-core coils).

Figure 17:
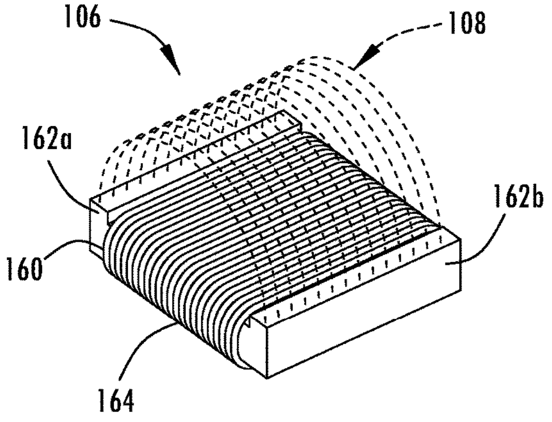
FIG. 17 is a perspective view of an induction coil shown in FIG. 16.
Figure 17A:
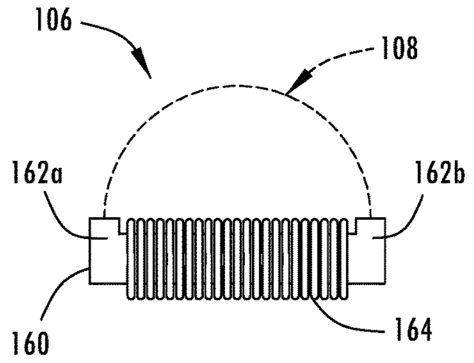
FIG. 17A is a side elevation view of the induction coil shown in FIG. 17.
Figure 18:
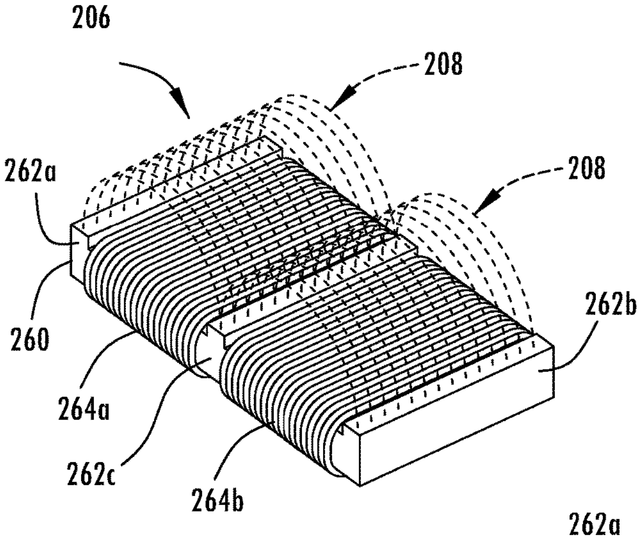
FIG. 18 is a perspective view of an additional example of an induction coil.
Figure 18A:
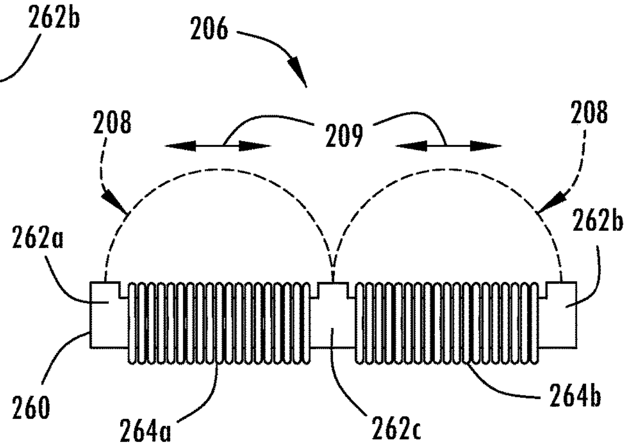
FIG. 18A is a side elevation view of the induction coil shown in FIG. 18.
Figure 19:
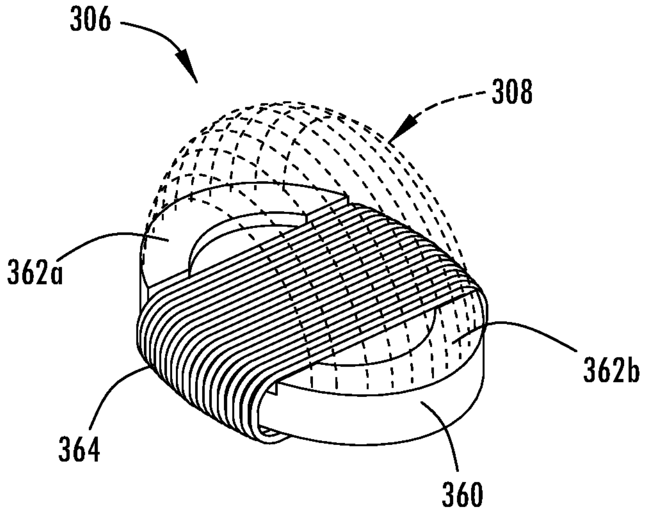
FIG. 19 is a perspective view of another example of an induction coil.
Figure 19A:
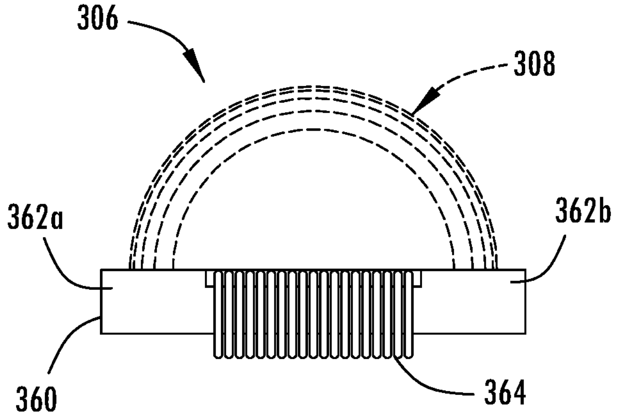
FIG. 19A is a side elevation view of the induction coil shown in FIG. 19.
Figure 20:
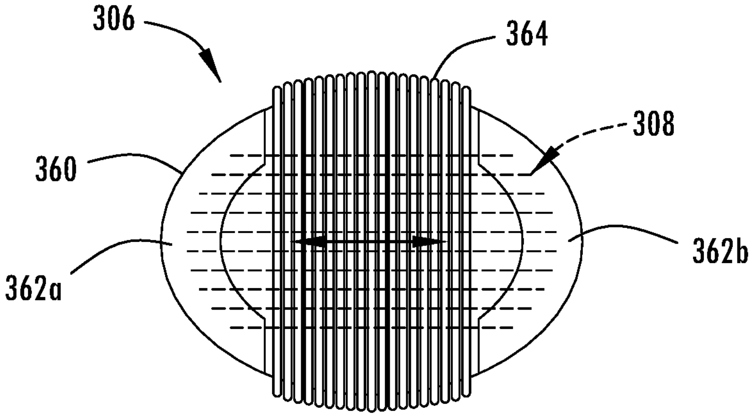
FIG. 20 is a top plan view of the induction coil shown in FIG. 19.

As shown in FIGS. 16-17A, the induction coils 106 are shaped as a C-core coil and include a base portion 160 and pole portions 162*a*, 162*b* protruding from opposing ends of the base portion 160, where the base and pole portions comprise a ferrite material. Further, windings 164 may be disposed around the base portion 160 to define the north and south poles at the pole portions 162*a*, 162*b* that are oriented to direct the magnetic poles toward the display panel 126. As shown in FIGS. 18 and 18A, another example of an open-core induction coil 206 is shown as an E-core coil. The E-core coil 206 include a base portion 260 and pole portions 262*a*, 262*b*, 262*c* protruding from opposing ends and a central area of the base portion 260, in the same direction, such as toward the display panel 126. Further, two sections of windings 264*a*, 264*b* may be disposed around the base portion 260 between the pole portions 262*a*, 262*b*, 262*c* to generate are two separate magnetic fields 208*a*, 208*b*, each with the flux direction 209 in general parallel alignment with each other so as to be capable aligning with the data lines 122.

In some cases, the squared or rectangular C-core coils 106 or E-core coils 206 may not generate a magnetic field with a uniform direction near the edges of the coil. To better align the generated magnetic field, the edges of the coil may be rounded (i.e., the edges may be arcuate) as opposed to the traditional squared edges. For example, the shape of the core may resemble a pot core. Surfaces along or near the edges may be concave or convex to help ensure a uniform magnetic field along the entirety of the coil. As shown for example in FIGS. 19-20, an additional implementation of such a C-core coil 306 is shown having concave raised poles that are configured to provide generally linear magnetic flux between the poles when viewed in the Z-direction from above the coil. The curved C-core coils 306 include a base portion 360 and curved pole portions 362*a*, 362*b* protruding from opposing ends of the base portion 360, where the base and pole portions comprise a ferrite material. Further, windings 364 may be disposed around the base portion 360 to define the north and south poles at the pole portions 362*a*, 362*b* that are oriented to direct the magnetic poles toward the display panel 326.

Referring now to FIGS. 21A-21D, a threshold distance D is provided between the upper surface of the top plate 104 and the display panel 126 to provide a space for sufficient insulation to prevent a hot object (i.e., cookware object 116) resting on the top plate 104 from damaging the display panel 126, such as by heating it above its threshold operating temperature. The threshold distance D may depend upon the type(s) and density of insulation used in the space. The insulation is desirably transparent to prevent blurring or otherwise distorting the image quality of the display panel 126 or other illumination panel, such that the insulation may be referenced as a transparent thermal insulator 170. The transparent thermal insulator 170 may be a gas, liquid, or solid state insulation. In the case of gas or liquid, the insulating material may flow through the open space (i.e., between the lower surface of the top plate 104 and the upper surface of the display panel 126), such as to remove heat being transferred between the opposing surfaces. The transparent thermal insulator 170 may also be a silica aerogel material that is disposed at one or more locations between an upper surface of the display panel 126 and the lower of the top plate 104. Also, the transparent thermal insulator may be integrated with the top plate or may be disposed between the top plate and display, such that the top plate may be a homogenous panel (e.g., a glass panel).

Figure 21A:
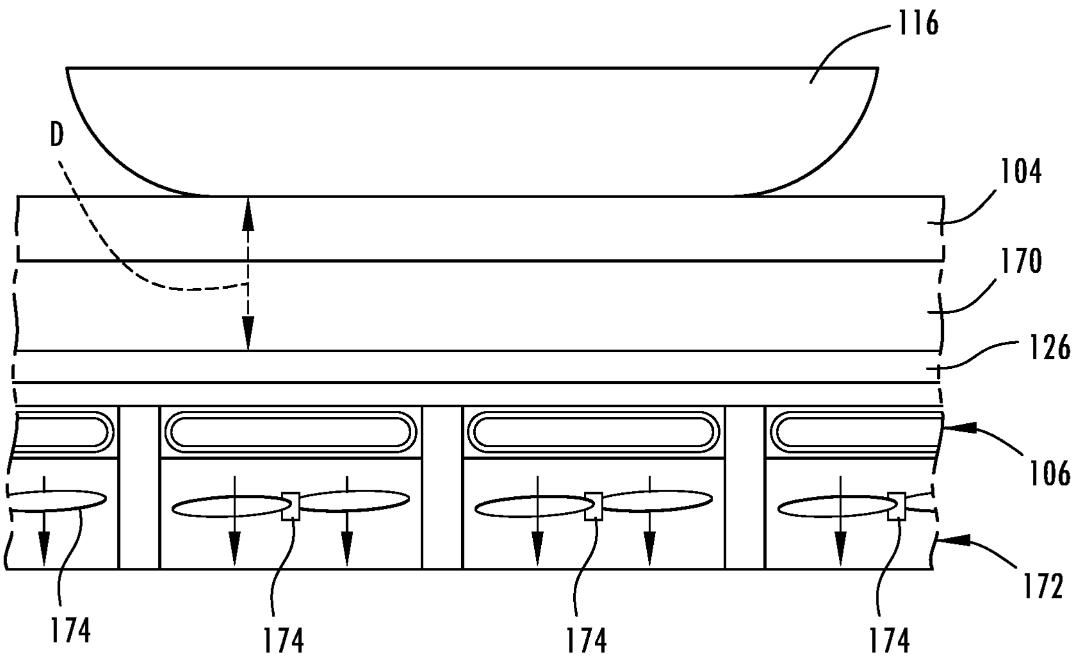
FIG. 21A is a sectional side view of the inductive cooktop shown in FIG. 15, showing a cooling system for the induction coils.
Figure 21B:
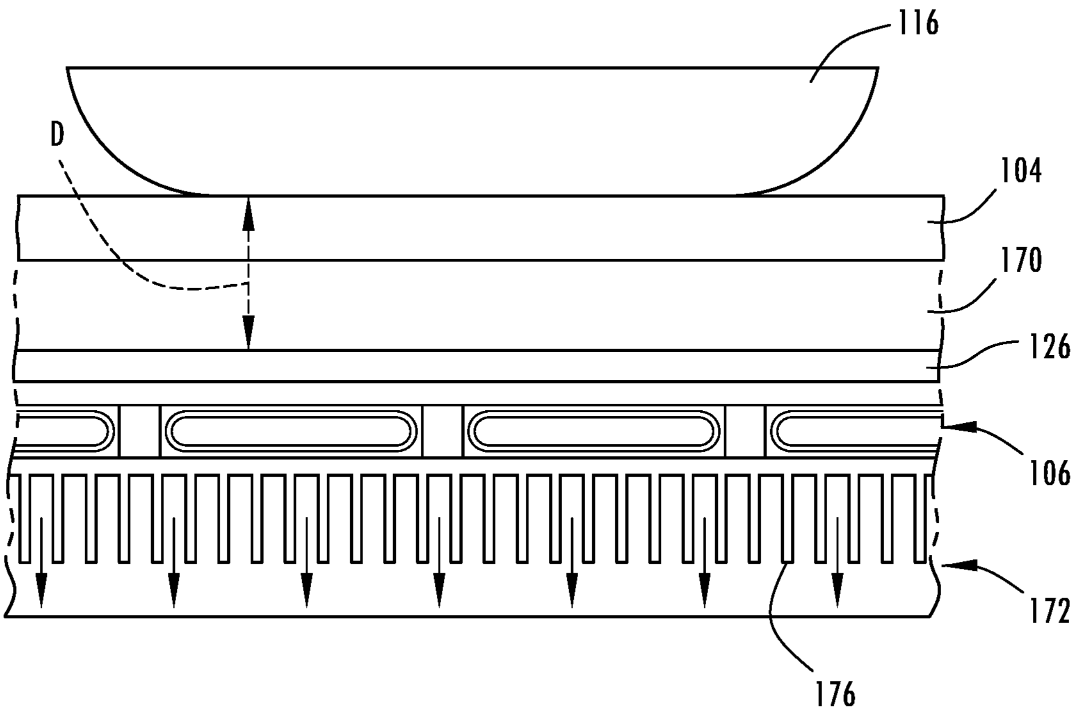
FIG. 21B is a sectional side view of an additional example of an induction cooktop.
Figure 21C:
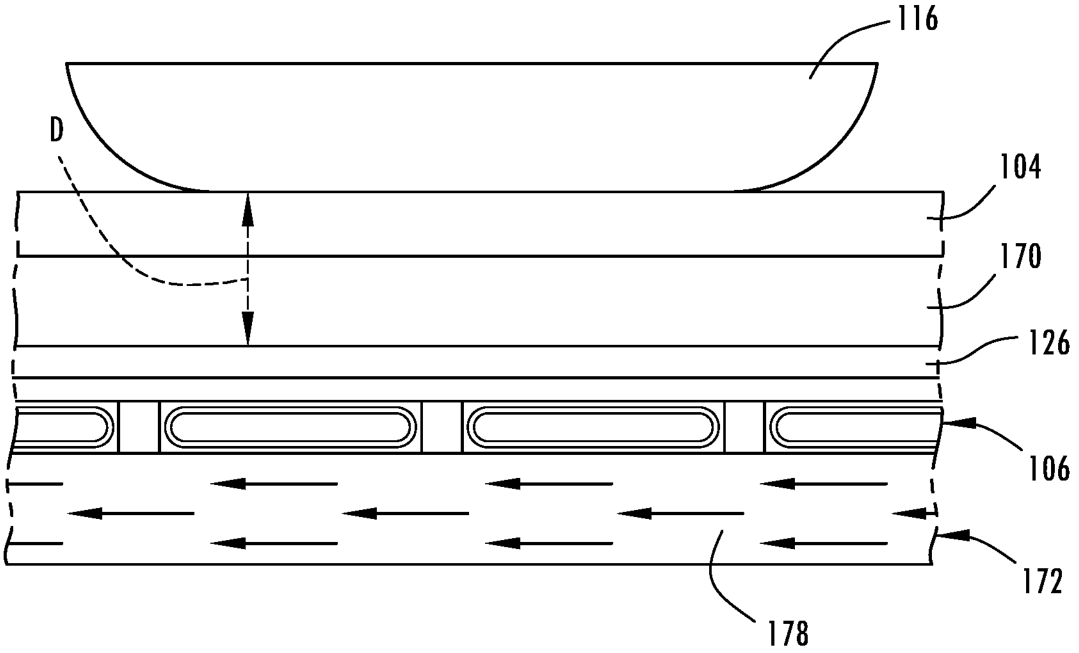
FIG. 21C is a sectional side view of another example of an induction cooktop.
Figure 21D:
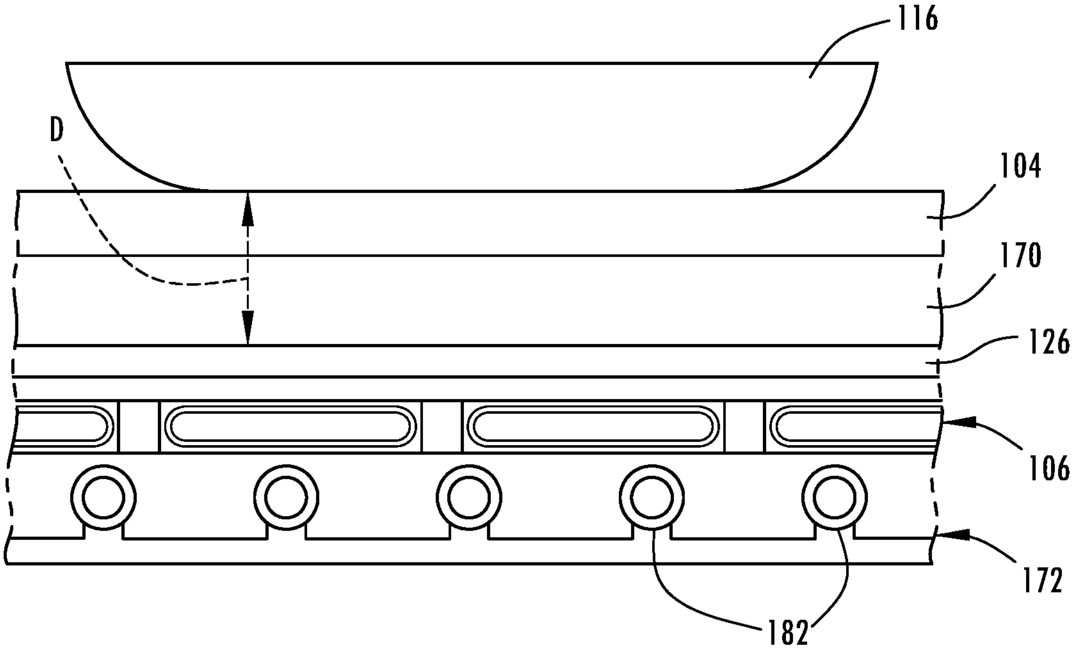
FIG. 21D is a sectional side view of yet another example of an induction cooktop.

With further to FIGS. 21A-21D, in some examples, a cooling system 172 may be connected with or interface with the induction coil 106 for cooling the induction coils 106 and associated circuitry below a threshold temperature and preventing heat transfer (from the induction coils 106) to the display panel 126. In some examples, below the display panel, a glass support may be provide a non-conducting support for the display panel. Also an air gap, such as between 0.5 mm and 2 mm, may be provided between the coils 106 and the display panel 126. The cooling system 172, such as shown in FIG. 21A, may include individual down draft fans 174 that pull air around from the coils in a downward direction away from the display panel 126. For example, the downdraft fan 174 may pull air away from the air gap between the coils and display panel. In another example shown in FIG. 21B, the cooling system 172 provides a heat sink 176 conductively coupled with the lower surface of the induction coils 106. The head sink 176 has metal fins that extend downward away from the induction coils 106 to draw head away from the induction coils. It is contemplated that air or liquid may be circulated over the fins of the heat sink 176 to improve heat transfer. Further, in another example shown in FIG. 21C, a fluid passage (for air or liquid) is arranged to flow laterally along the lower surface of the induction coils 106. Moreover, in another example shown in FIG. 21D, a heat sink 180 is provided with liquid coolant tubing 182 that circulates through the heat sink 180 to likewise draw heat from the lower surface of the induction coils 106.

Figure 22:
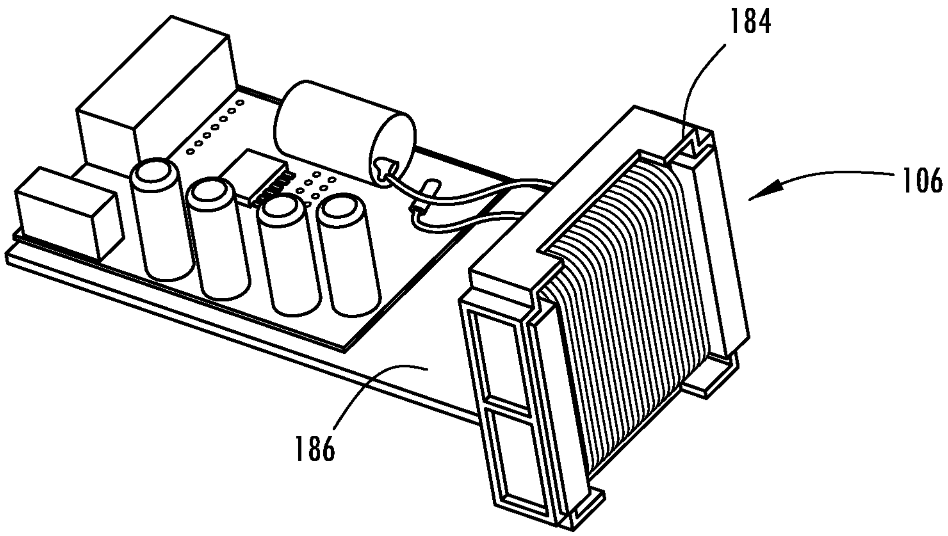
FIG. 22 is a perspective view of an induction coil and a controller circuit.
Figure 23:
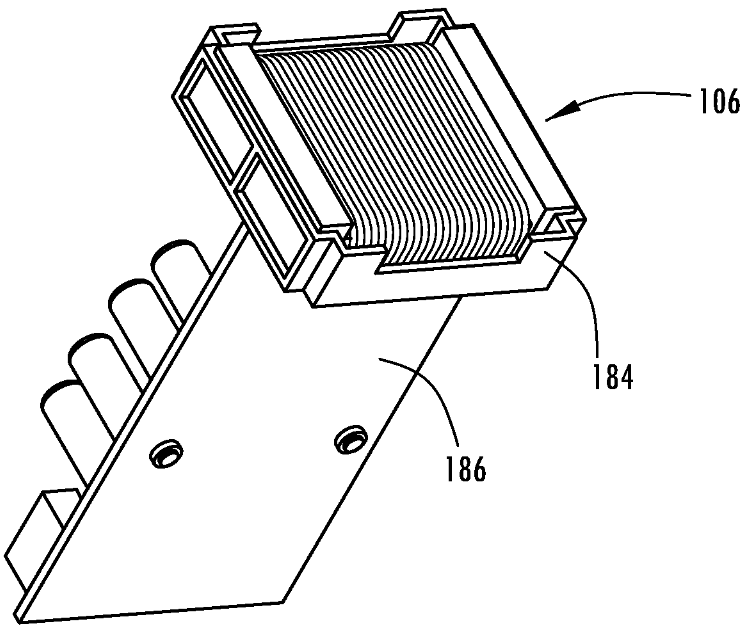
FIG. 23 is another perspective view of the induction coil shown in FIG. 22.

As shown in FIGS. 22 and 23, the induction coils 106 are held in a housing 184 that includes a circuitry support extension 186 that extends downward from the housing 184. The circuitry support extension 186 may be utilized to attach control circuitry for one or more induction coils, such as the corresponding induction coil in the housing and additional coils.

The inductive cooktop 100, such as shown in FIG. 15, induction coils 106 disposed below the top plate in an array, such as with aligned rows and columns of induction coils 106 as shown in FIG. 15. In other examples, the array may be arranged in columns of induction that are staggered or nested, such that the induction coils may not be aligned in rows. A controller is configured to control a frequency and an intensity of electromagnetic fields generated by each of the induction coils 106. The controller may also, for example, determine whether a cookware object is present above each of the induction coils 106, and based on such determination, control the frequency and the intensity of the electromagnetic field of the corresponding induction coil 106. In some aspects, the controller may cause electromagnetic fields to be emitted or increase the intensity of the electromagnetic fields emitted by only a portion of the induction coils in response, at least in part, to determining that a cookware object is present above the portion of the induction coils.

Figure 24:
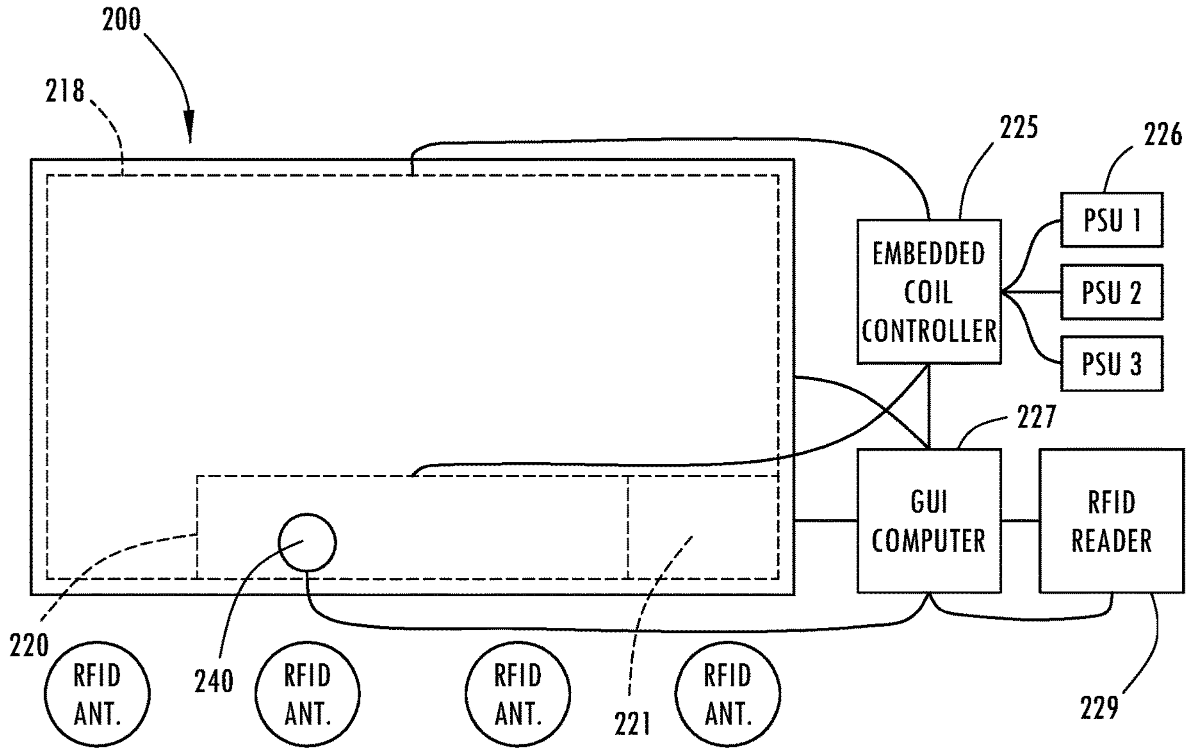
FIG. 24 is a top schematic view of an inductive cooktop.

Referring now to FIG. 24, an additional example of an inductive cooktop 200 includes multiple optional zones on the top plate, such as cooking zone 218, a control zone 220, and touch interface zone 221. These zones may not be visible to a user and may have different or overlapping functionality. These zones may be predefined or may be flexible zones, such as capable of being configurable by a user with settings on the cooktop. The cooking zone 218, such as shown in FIG. 24, may include a plurality of induction coils arranged in an array of coils (e.g., an array of columns and/or rows) that provide a large surface for heating multiple pieces of cookware simultaneously. The coils (e.g., C-core coils) generate magnetic fields with a direction parallel to the data lines of the overlapping display panel 226. The control zone 220 may include one or more induction coils that form an area configured to sense and couple with an interface device, such as a knob 240. In some examples, the coils in the control zone may be the same coils as those that form the multi-core cooking zone 218, or alternatively may be different coils (e.g., spiral coils). The touch zone 221 may be configured to receive touch inputs from a user of the inductive cooktop 200, such as to interface with a graphical user interface (GUI) computer 227 that displays a corresponding visual interface at the overlapping portion of the display panel 226. The GUI computer 227 may receive the inputs from the user via the touch zone 221 and process the inputs to control the display and/or heating coils. An embedded coil controller 225 may also or alternatively receive inputs from the touch zone 221 (via the GUI computer 227) and/or the knob location area when a knob 240 is present to control the power provided to the coils. One or more power supply units (PSU) 226 provide the power to the embedded coil controller 225, which in turn distributes the power to the coils. In some examples, each coil has its own driver that the controller 225 provides power to when enabling the coil. In other examples, multiple coils share the same driver (e.g., via a solid-state switch) and the controller 225 controls multiple coils simultaneously via the shared driver. Portions of the cooktop (e.g., the knob location area) may provide wireless power to compatible devices placed atop the cooktop. In some examples, the inductive cooktop 200 includes one or more radio-frequency identification (RFID) antennas 231 and an RFID reader 229 to detect RFID tags placed on the RFID antennas 231, such as an RFID tag disposed on the object placed on the cooktop to identify characteristics of the object and associated data. For example, the object may include product packaging with an embedded RFID tag, such as a metal food packaging that is configured to be used without an underlying piece of cookware.

In some examples, the embedded coil controller 225 provides power to a particular inductive coil when the controller 227 determines that a cookware object (i.e., a piece of suitable metal) is present above the particular coil. This may increase the safety of the cooktop by ensuring that the cooktop does not attempt to heat non-cookware objects. In some implementations, the controller 225 may transmit a probe signal to each coil (such as coils 106 shown in FIG. 15 or those in the cooking area 218) to determine if an object is above the coil (i.e., immediately above the cooktop surface above the coil). The probe signal, in some examples, includes providing a small amount of power (relative to the amount of power required to heat a cookware object) to the inductive coil. That is, the probe signal may include an alternating current flowing through the coil. The controller 225 may measure a result from the probe signal to determine if a cookware object is above the coil. For example, the controller 225 may determine the amount of power the coil draws from a power rail when receiving the probe signal. When the power drawn or consumed satisfies a threshold amount, the controller 225 may determine that a cookware object is above the coil and when the power drawn fails to satisfy a threshold amount, the controller 225 may determine that a cookware object is not above the coil. In addition to determining that no object is present above the coil, the controller 225 may additionally determine that an object present above the coil is not the proper material, that the object is not large enough, and/or that the object is only partially over the coil.

In some examples, the controller 225 sends the probe signal to one coil at a time, and sequentially checks each coil (such as coils 106 shown in FIG. 15 or those in the cooking area 218). The controller 225 may wait for all coils to be evaluated before enabling any of the coils. After all coils have been evaluated, the controller 225 may enable or activate each coil that the controller determines has a cookware object above it. The controller 2225 may enable a number of coils for one or more objects. Multiple coils may be enabled for a single cookware object, and multiple cookware objects may be heated simultaneously.

Optionally, the controller 225 may send the probe signal to more than one coil at a time. The controller 225 may send the probe signal at frequencies other than the resonant frequency of a probed coil to reduce the amount of current that is induced in other coils in close proximity to the probed coil. Because other coils may have the same resonant frequency as the probed coil, a probe signal at the resonant frequency may induce current in other coils in addition to the probed coil. Current induced in coils other than the coil being probed may lead to inaccurate results (e.g., an object above a nearby coil may be determined to be above the probed coil). When the probe signal is at a frequency that is not near the resonant frequency, due at least in part to a high Q factor of the coils, the current may not be coupled. The controller 225 may probe multiple coils at different frequencies simultaneously. In other examples, the controller 225 may probe coils simultaneously that are greater than a threshold distance apart in order to limit or eliminate the amount of current that is induced in other probed coils. That is, two coils that are of a sufficient distance apart to not couple may be probed simultaneously. The controller 225 may short circuit coils to ground (e.g., via field-effect transistors (FET)) coils that are not currently being probed.

Referring again to FIG. 15, in some implementations, the controller may engage or enable two or more adjacent coils 106 in the same column of the array of coils simultaneously whenever a cookware object is detected above either coil. When enabling only a single coil at a time, because the coil has a resonant frequency similar to other nearby adjacent and disabled coils, current may be induced in these disabled coils. However, two adjacent coils 106 (or three, or four, etc.) in the same column of the array, when both enabled, electrically behave as if they are in parallel, which causes the resonant frequencies of both coils to substantially increase. That is, by activating or enabling two or more coils simultaneously, the coils may practically be in parallel without requiring the additional circuitry necessary to actually parallelize the coils. Other nearby coils that are not activated may be grounded (e.g., via FETs), have a very high Q factor, and have a resonant frequency that is much lower than the activated coils. Because the resonant frequencies of the enabled coils substantially increases such that their resonant frequency is substantially greater than other nearby coils, minimal current will be induced or coupled to other nearby disabled coils when two or more adjacent coils within the same column of the array of coils are enabled.

In some implementations, the coils, when disabled, may be disconnected from the rest of the circuitry (e.g., other coils) via a relay. In other implementations, the coils may change resonant frequencies via, for example, switching or changing capacitors.

For purposes of comparison, in an example the C-core coil below a display panel allows for a much greater power input than a similarly arranged pancake coil below a display panel (e.g., 1000 W vs. 50 W), while still providing high graphic quality without interference or damage to the display panel.

Figure 11:
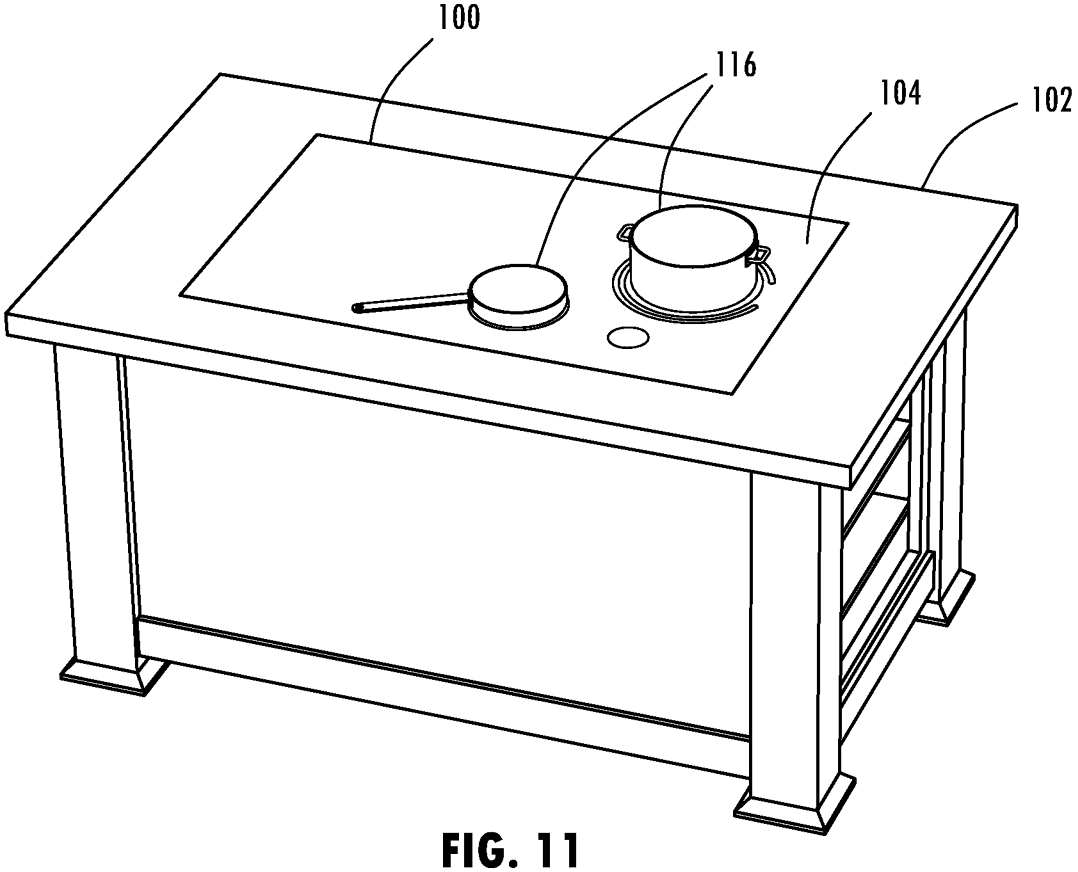
FIG. 11 is a perspective view of an island countertop having an inductive cooktop.

For purposes of this disclosure, the terms “upper,” “lower,” “right,” “left,” “rear,” “front,” “vertical,” “horizontal,” and derivatives thereof shall relate to the inductive cooktop as oriented in FIG. 11. However, it is to be understood that the inductive cooktop may assume various alternative orientations, except where expressly specified to the contrary. It is also to be understood that the specific devices and processes illustrated in the attached drawings and described in this specification are simply exemplary embodiments or implementations. Accordingly, the terminology that has been used is intended to be in the nature of words of description rather than of limitation. Hence, specific dimensions and other physical characteristics relating to the embodiments or implementations disclosed herein are not to be considered as limiting, unless the claims expressly state otherwise. Many modifications and variations of the embodiments and implementations are possible in light of the above teachings.

The invention claimed is:

1. An inductive cooktop comprising:

a transparent panel configured to support a cookware object;

an electrically actuated panel disposed below the transparent panel, the electrically actuated panel comprising a first set of lines and a second set of lines disposed orthogonal to each other to form a two-dimensional matrix that is configured to operate associated elements with an addressing scheme; and a plurality of induction coils disposed below the electrically actuated panel, the plurality of induction coils operable to generate an electromagnetic field that inductively couples with the cookware object supported at the transparent panel, wherein the plurality of induction coils each comprise a north pole and a south pole facing the electrically actuated panel and operable to generate the electromagnetic field with a flux direction in parallel alignment with the second set of lines to prevent the electromagnetic field from inducing a voltage on the second set of lines.

2. The inductive cooktop of claim 1, wherein the electrically actuated panel comprises a plurality of illumination elements connected to the two-dimensional matrix.

3. The inductive cooktop of claim 1, wherein the electrically actuated panel comprises a display panel having scan lines and data lines, the first set of lines comprising the scan lines and the second set of lines comprising the data lines.

4. The inductive cooktop of claim 3, wherein the display panel comprises an organic light emitting diode (OLED)

display panel, a thin-film-transistor liquid-crystal display (TFT LCD) panel, a light-emitting diode display (LED) panel, a plasma display panel (PDP), a liquid-crystal display (LCD) display panel, a quantum dot display (QLED) panel, or an electroluminescent display (ELD) panel.

5. The inductive cooktop of claim 1, wherein each of the plurality of induction coils comprises a C-core coil or an E-core coil.

6. The inductive cooktop of claim 1, wherein each of the plurality of induction coils comprises a C-core coil, and wherein the C-core coil comprises a base portion and pole portions protruding from opposing ends of the base portion.

7. The inductive cooktop of claim 6, wherein the base portion and pole portions comprise a ferrite material, and wherein the C-core coil further comprises windings disposed around the base portion to define the north and south poles at the pole portions.

8. The inductive cooktop of claim 1, wherein a thermal gap is disposed between the transparent panel and the electrically actuated panel to prevent heat generated at the cookware object from heating the electrically actuated panel above a threshold operating temperature.

9. The inductive cooktop of claim 1, further comprising a cooling system disposed below the electrically actuated panel and operable to cool the plurality of induction coils below a threshold temperature.

10. The inductive cooktop of claim 1, further comprising a controller configured to control a frequency and an intensity of electromagnetic fields generated by each of the plurality of induction coils.

11. The inductive cooktop of claim 10, wherein the controller is configured to determine whether the cookware object is present above each of the plurality of induction coils, and wherein the controller controls the frequency and an intensity of the electromagnetic field of each of the plurality of induction coils based on the determination of whether the cookware object is present above the corresponding induction coil.

12. The inductive cooktop of claim 11, wherein the controller increases an intensity of the electromagnetic fields emitted by only a portion of the plurality of induction coils in response at least in part to determining that a cookware object is present above the portion of the plurality of induction coils.

13. The inductive cooktop of claim 11, wherein the controller is configured to transmit a probe signal to each coil to determine whether a cookware object is present above the corresponding induction coil.

14. The inductive cooktop of claim 13, wherein the probe signal is a frequency that is different from a resonant frequency of each coil.

15. The inductive cooktop of claim 1, wherein the plurality of induction coils comprises an array of rows and columns of induction coils, and wherein the controller increases the intensity of the electromagnetic fields generated by at least two of the plurality of induction coils within the same column to increase a resonant frequency of the at least two induction coils within the same column.

16. An inductive cooktop comprising:

a top plate configured to support an object that comprises a ferrous metal;

a plurality of induction coils disposed below the top plate; and an illumination panel disposed between the plurality of induction coils and the top plate and operable to emit light through the top plate, the illumination panel comprising scan lines disposed orthogonal to data lines, wherein the plurality of induction coils are operable to generate electromagnetic fields with a flux direction in parallel alignment with the data lines.

17. The inductive cooktop of claim 16, wherein each of the plurality of induction coils comprise an open-core coil having a north pole and a south pole oriented toward the illumination panel and the top plate.

18. The inductive cooktop of claim 16, wherein the illumination panel comprises an organic light emitting diode (OLED) display panel, a thin-film-transistor liquid-crystal display (TFT LCD) panel, a light-emitting diode display (LED) panel, a plasma display panel (PDP), a liquid-crystal display (LCD) display panel, a quantum dot display (QLED) panel, or an electroluminescent display (ELD) panel.

19. The inductive cooktop of claim 16, further comprising a controller configured to control a frequency and an intensity of electromagnetic fields generated by each of the plurality of induction coils.

20. The inductive cooktop of claim 19, wherein the controller is configured to determine whether a cookware object is present above each of the plurality of induction coils, wherein the controller controls the frequency and an intensity of the electromagnetic field of each of the plurality of induction coils based on the determination of whether the cookware object is present above the corresponding induction coil, and wherein the controller increases the intensity of the electromagnetic fields emitted by only a portion of the plurality of induction coils in response at least in part to determining that a cookware object is present above the portion of the plurality of induction coils.

* * * * *